(12) United States Patent
Ikeda et al.

(10) Patent No.: US 7,933,335 B2
(45) Date of Patent: Apr. 26, 2011

(54) MOVING PICTURE CONVERSION APPARATUS

(75) Inventors: Hiroshi Ikeda, Ibaraki (JP); Masaki Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 1503 days.

(21) Appl. No.: 11/287,052

(22) Filed: Nov. 25, 2005

(65) Prior Publication Data

US 2006/0120453 A1 Jun. 8, 2006

(30) Foreign Application Priority Data

Nov. 30, 2004 (JP) .................... 2004-347429

(51) Int. Cl.
H04N 11/02 (2006.01)
H04N 11/04 (2006.01)

(52) U.S. Cl. .................. 375/240.16; 375/240.24

(58) Field of Classification Search ............ 375/240.16, 375/240.24, 240.23, 240.12, 240.13, 240.14, 375/240.15, 240.1, 240.25, 240.17, 240.11, 375/240.27

See application file for complete search history.

(56) References Cited

U.S. PATENT DOCUMENTS

| | | | | |
|---|---|---|---|---|
| 5,539,466 A * | 7/1996 | Igarashi et al. | .......... | 375/240.15 |
| 5,926,225 A * | 7/1999 | Fukuhara et al. | .......... | 348/416.1 |
| 6,542,642 B2 * | 4/2003 | Takizawa et al. | ............ | 382/236 |
| 2004/0013399 A1 | 1/2004 | Horiguchi et al. | | |
| 2005/0041740 A1 | 2/2005 | Sekiguchi et al. | | |
| 2007/0036218 A1 | 2/2007 | Burazerovic | | |
| 2007/0258702 A1 * | 11/2007 | Sugio et al. | .................. | 386/109 |

FOREIGN PATENT DOCUMENTS

| | | |
|---|---|---|
| JP | 11-275592 | 10/1999 |
| JP | 2003-116104 | 4/2003 |
| JP | 2003-309851 | 10/2003 |
| WO | 02/073972 | 9/2002 |
| WO | WO 2004/093461 | 10/2004 |

OTHER PUBLICATIONS

Sullivan, Gary et al.; Draft of Version 4 of H.264/AVC (ITU-T Recommendation H. 264 and ISO/IEC 14496-10 (MPEG-4 part 10) Advanced Video Coding); Joint Video Team (JVT) of ISO/IEC MPEG & ITU-T VCEG (ISO/IEC JTC1/SC29/WG11 and ITU-T SG16 Q.6); Jan. 28, 2005; entire document.
Japanese Office Action for Application No. JP 2005-341009, 2 pages.
Japanese Office Action for Application No. JP 2005-341009, 2 pages.

* cited by examiner

Primary Examiner — Dov Popovici

(57) ABSTRACT

A moving picture conversion apparatus converts first moving image data encoded in accordance with a first motion compensated prediction method into second moving picture data that has a same format as data encoded in accordance with a second motion compensated prediction method. The moving picture conversion apparatus determines whether a relationship between a block in the second motion compensation method and an image used as a reference image with respect to the block confirms with a condition. When the relationship is determined to confirm with the condition, the moving picture conversion apparatus performs encoding using a motion vector or vectors of the first moving image data corresponding to the block.

18 Claims, 29 Drawing Sheets

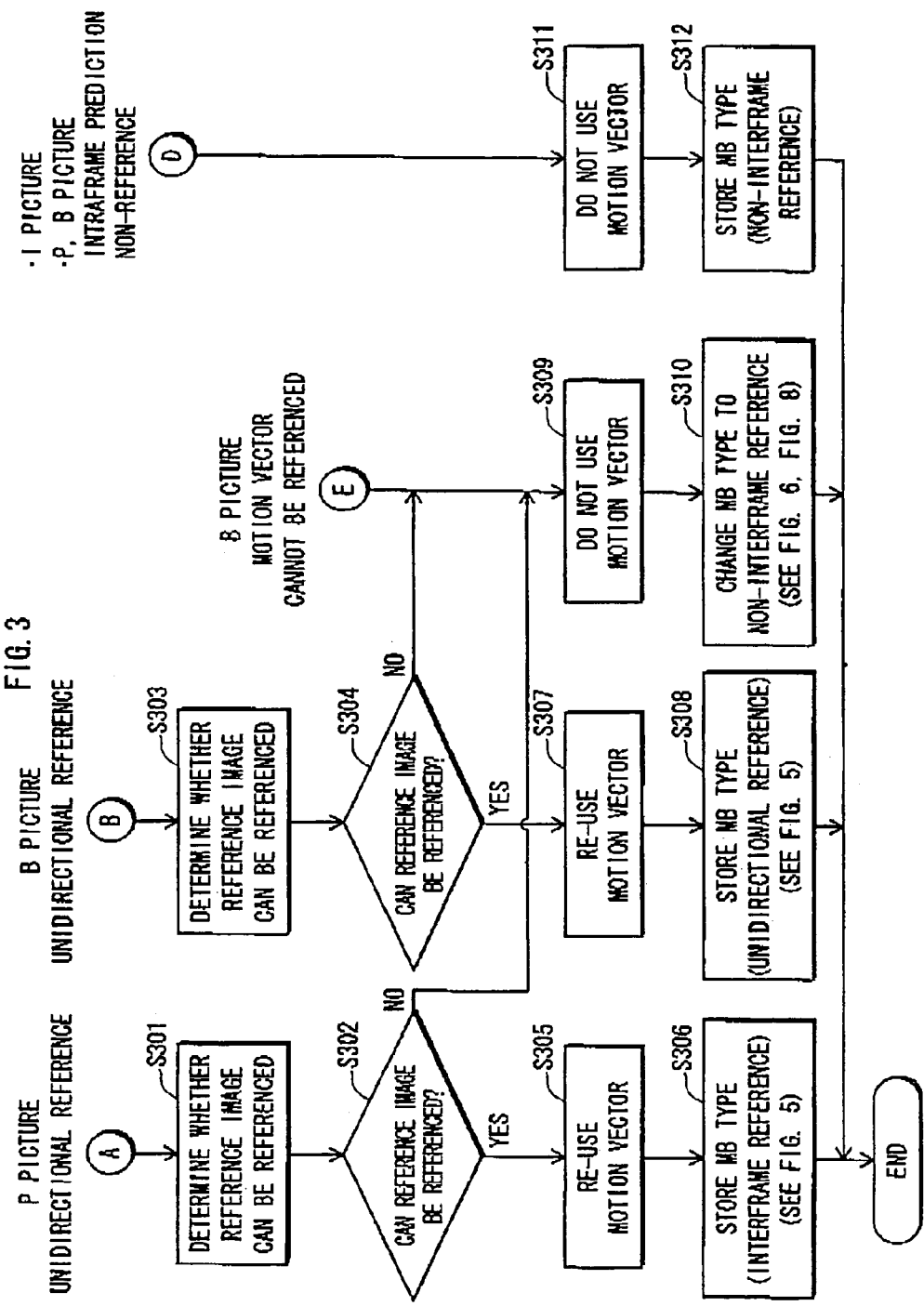

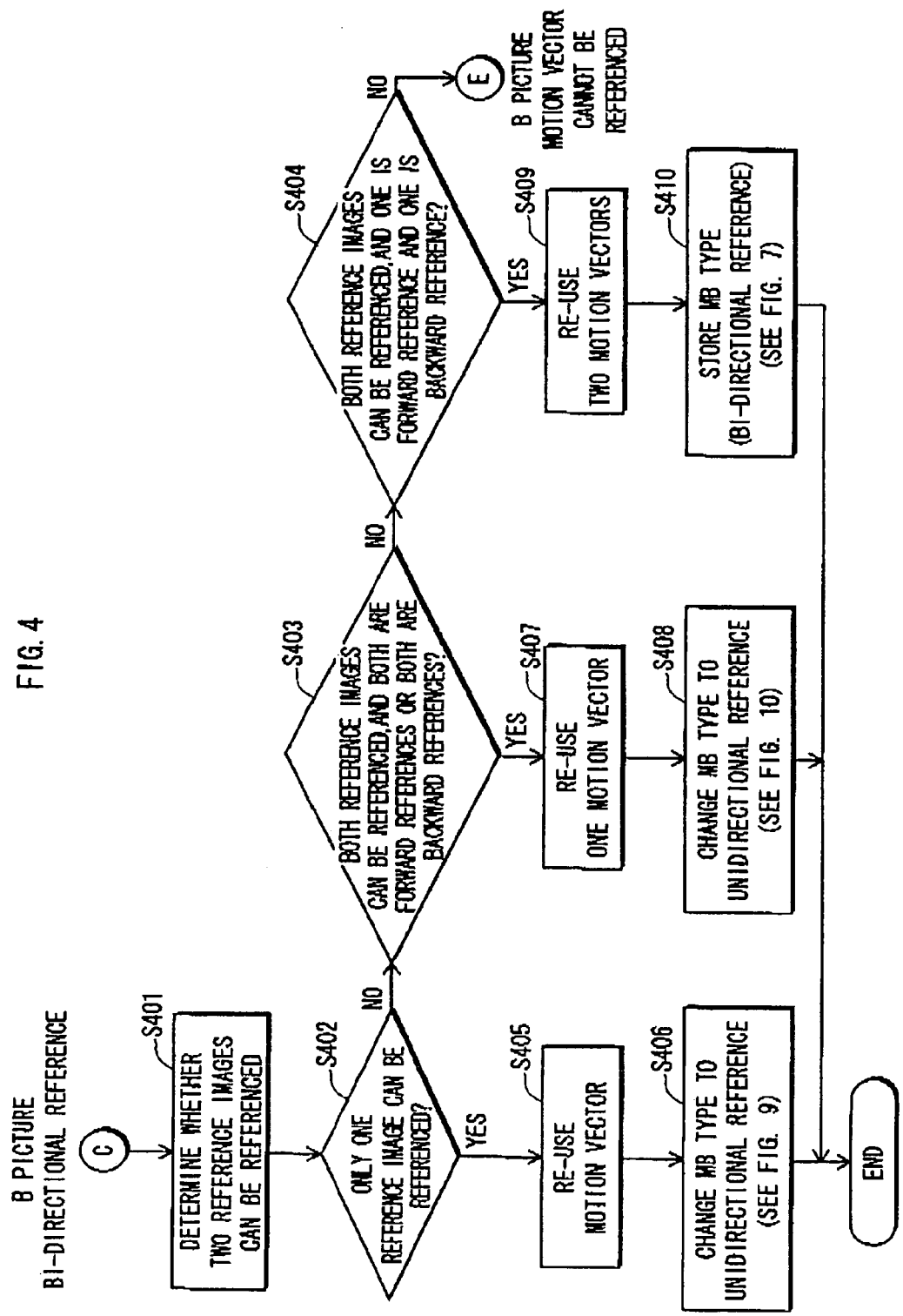

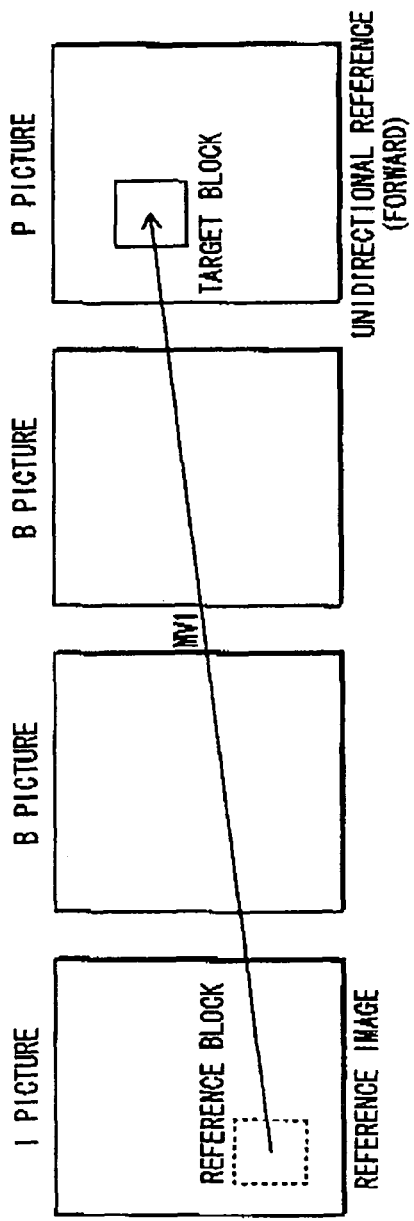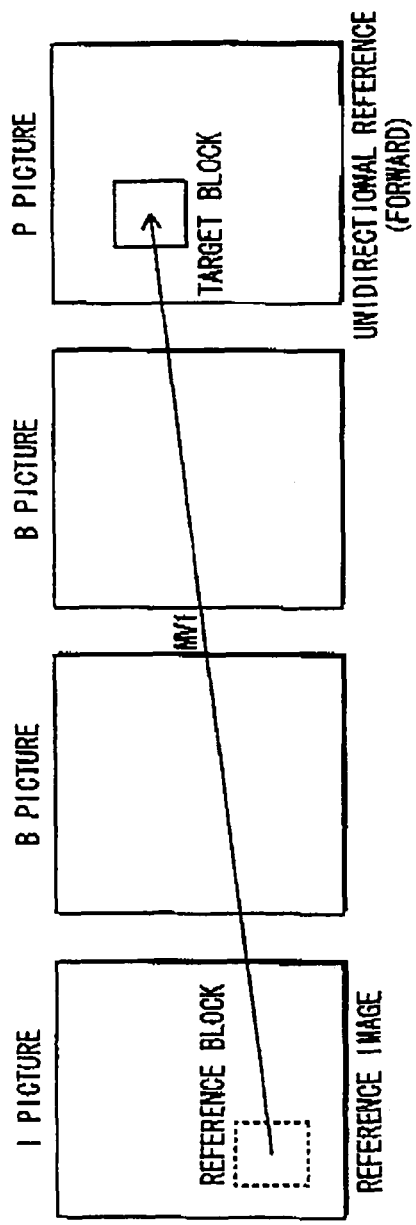

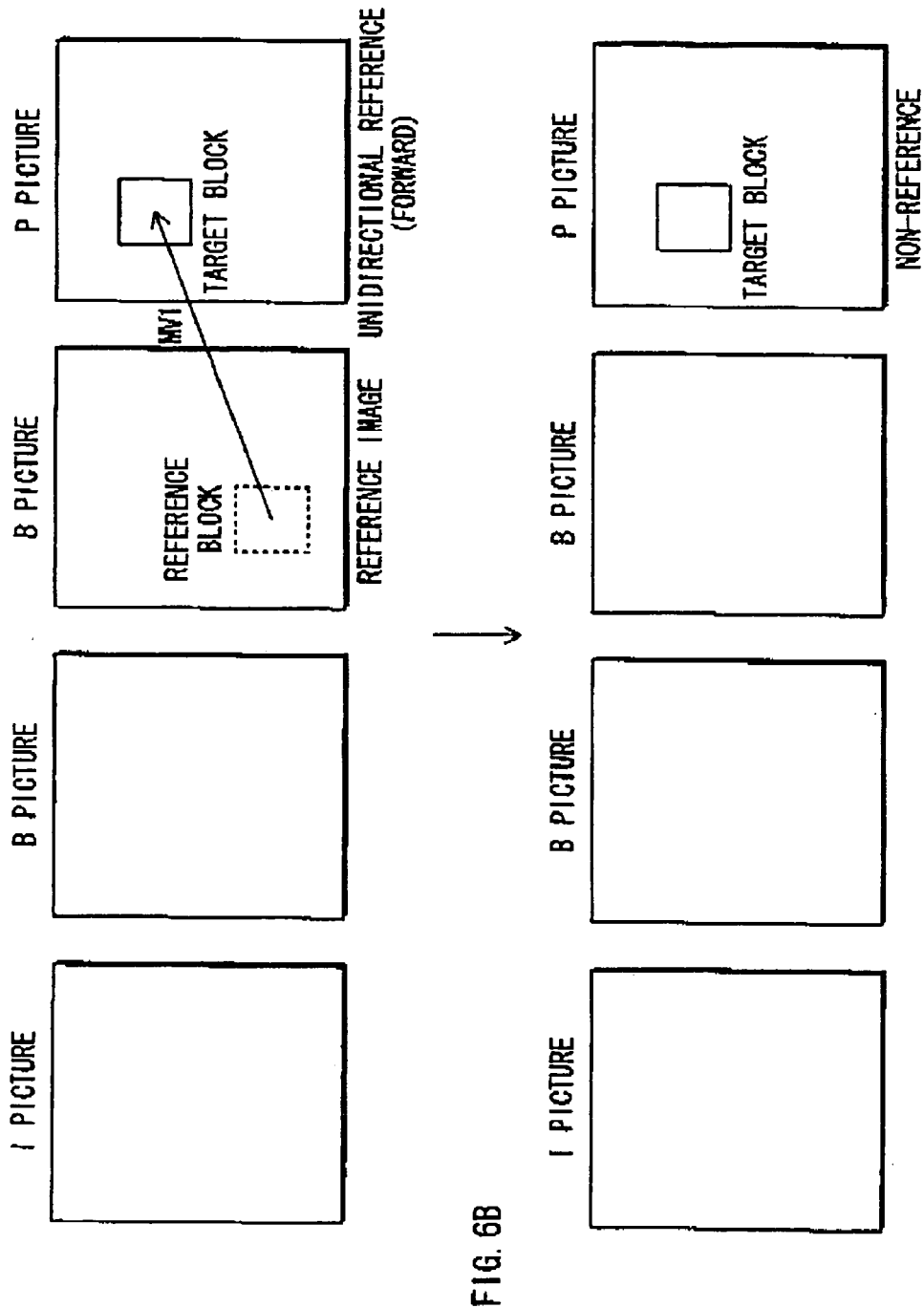

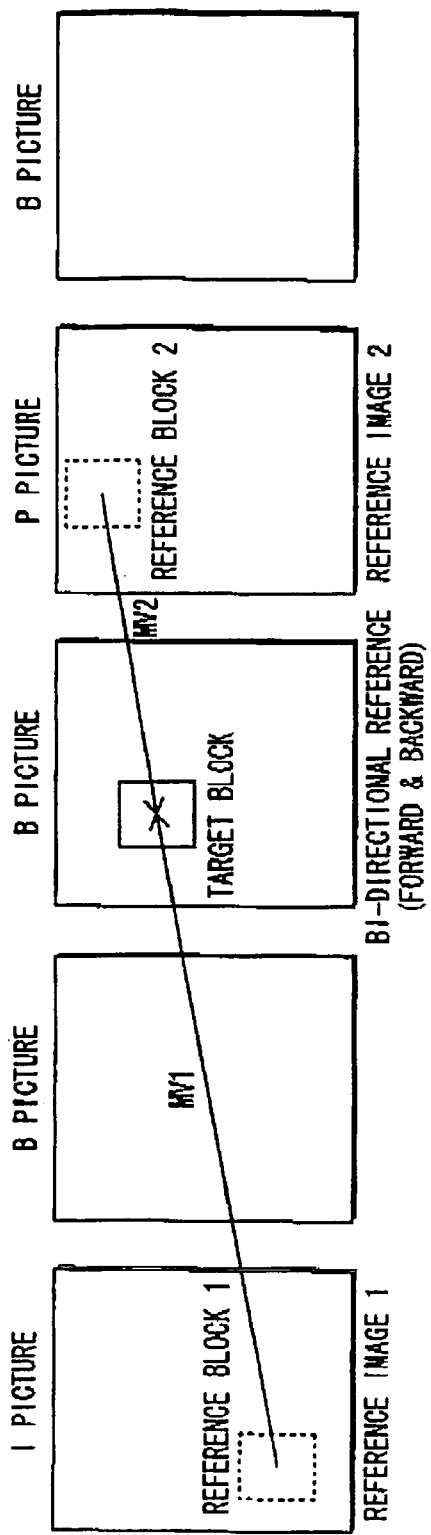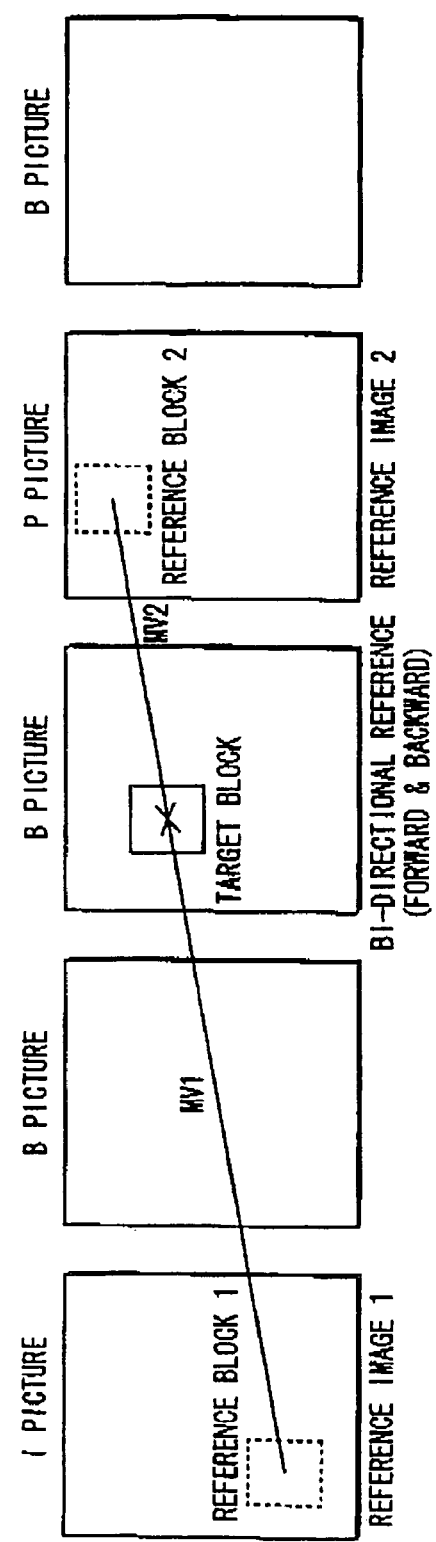

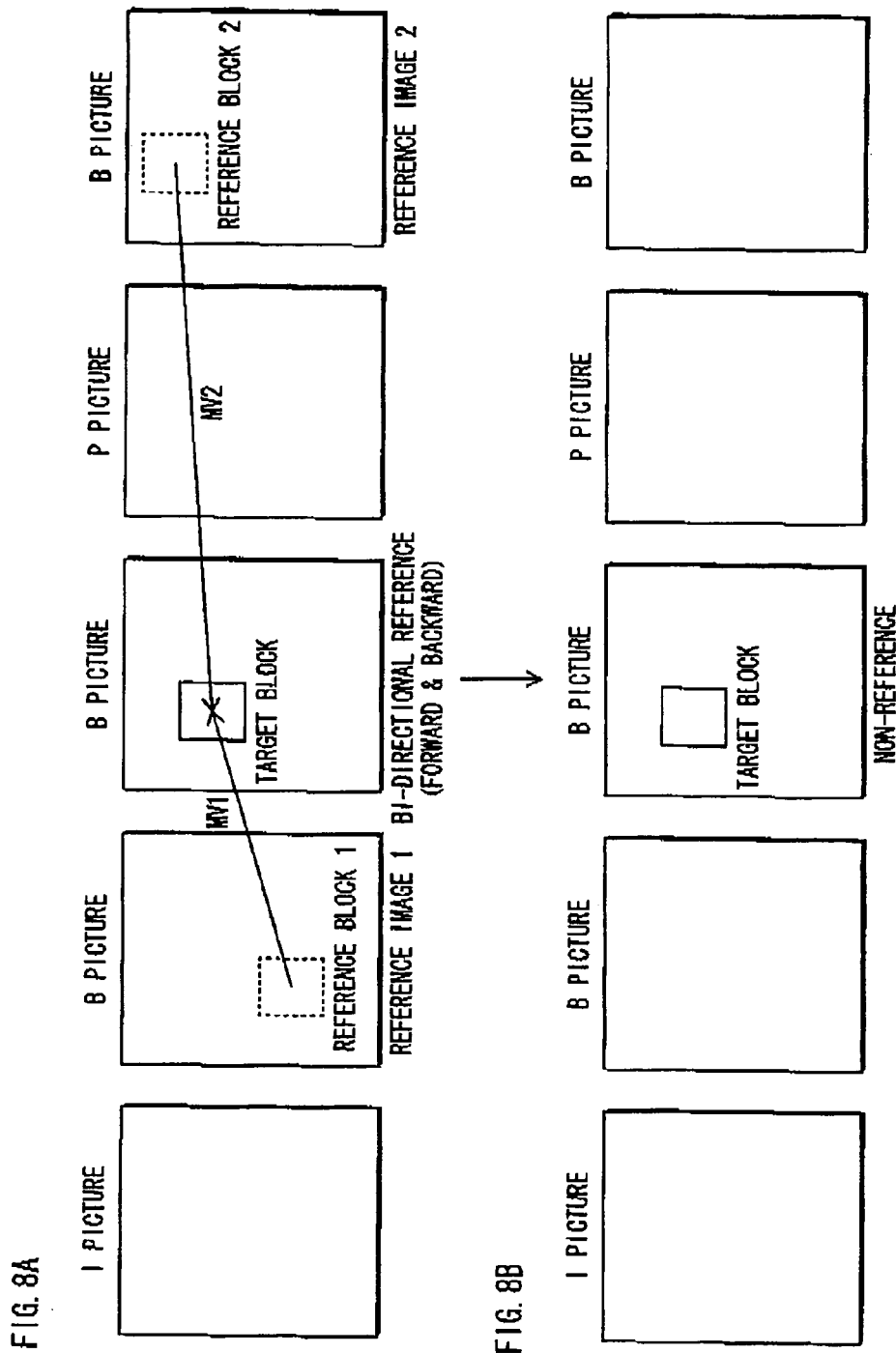

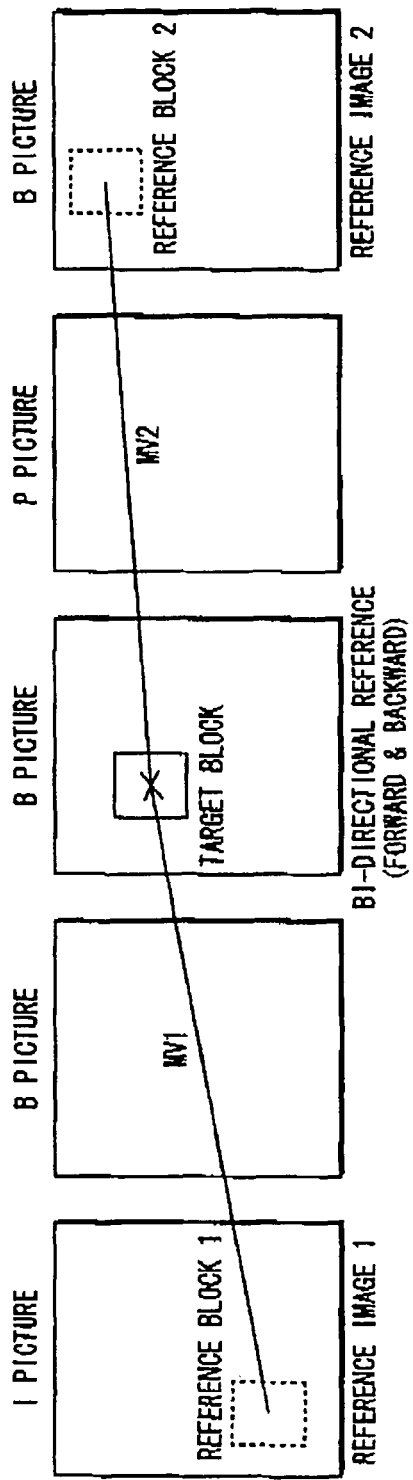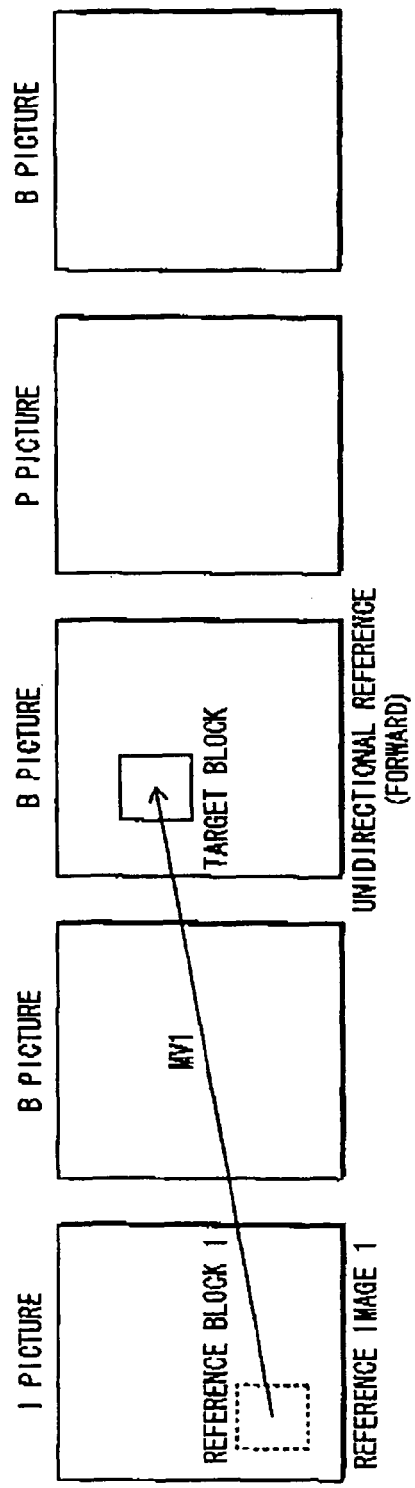

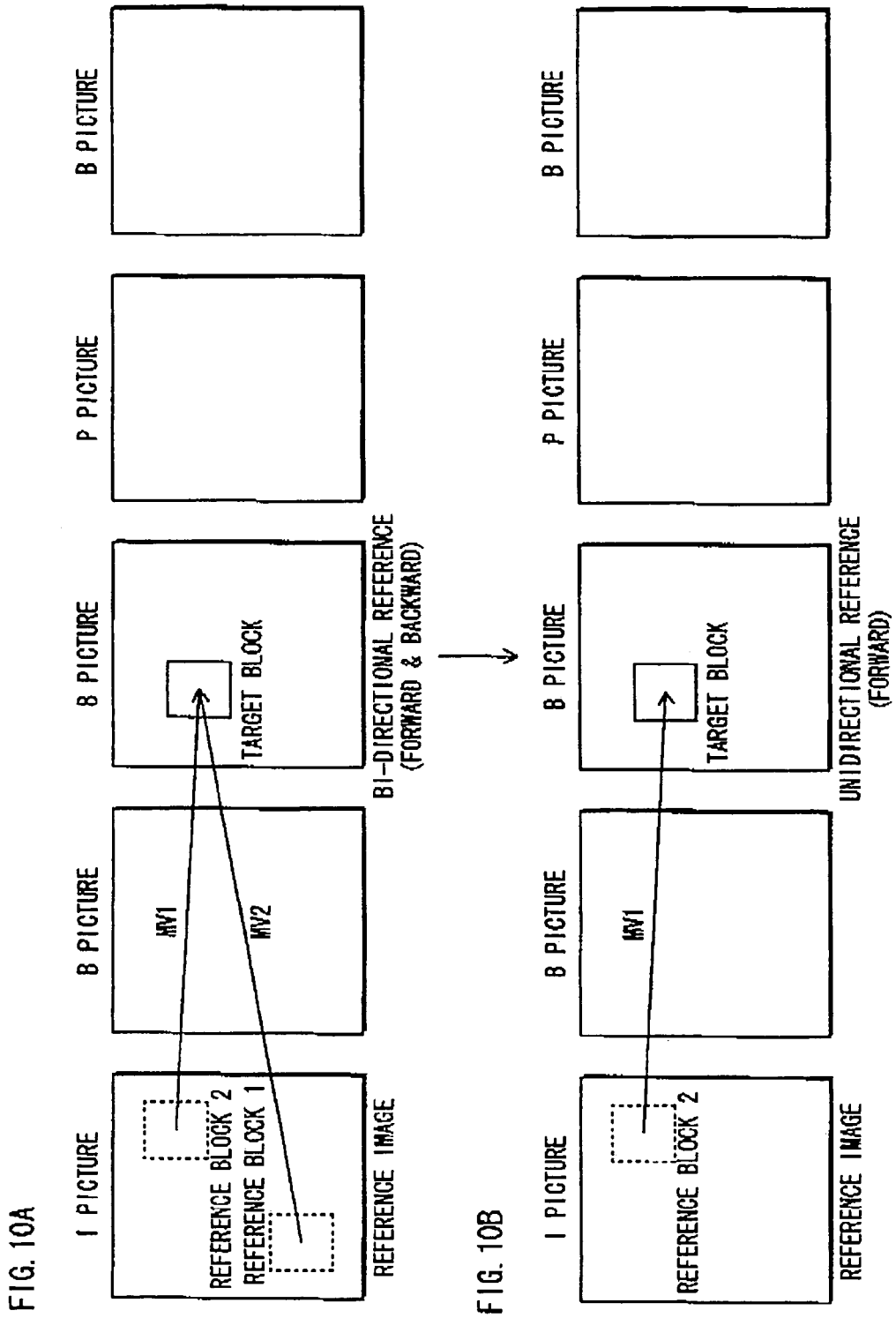

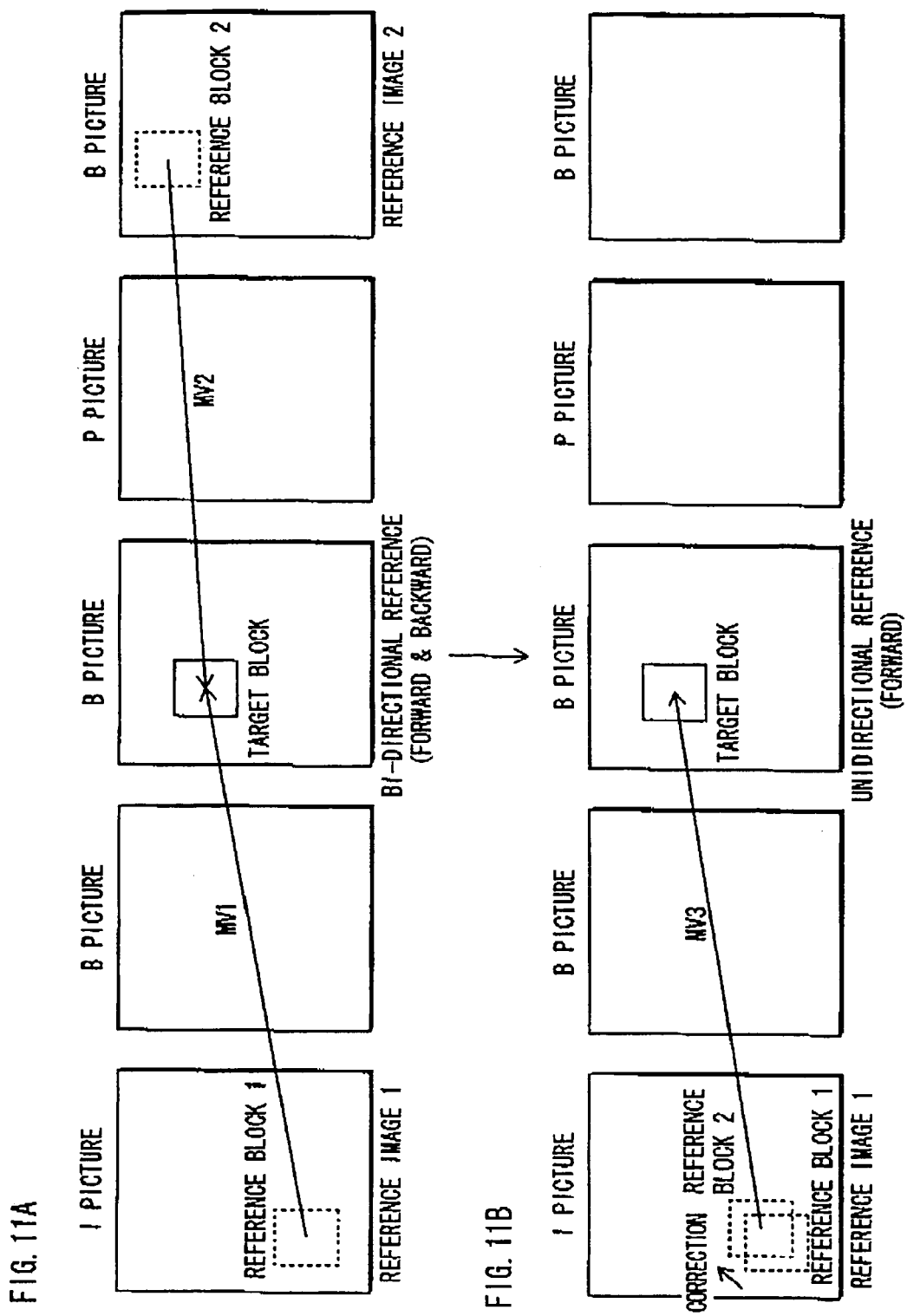

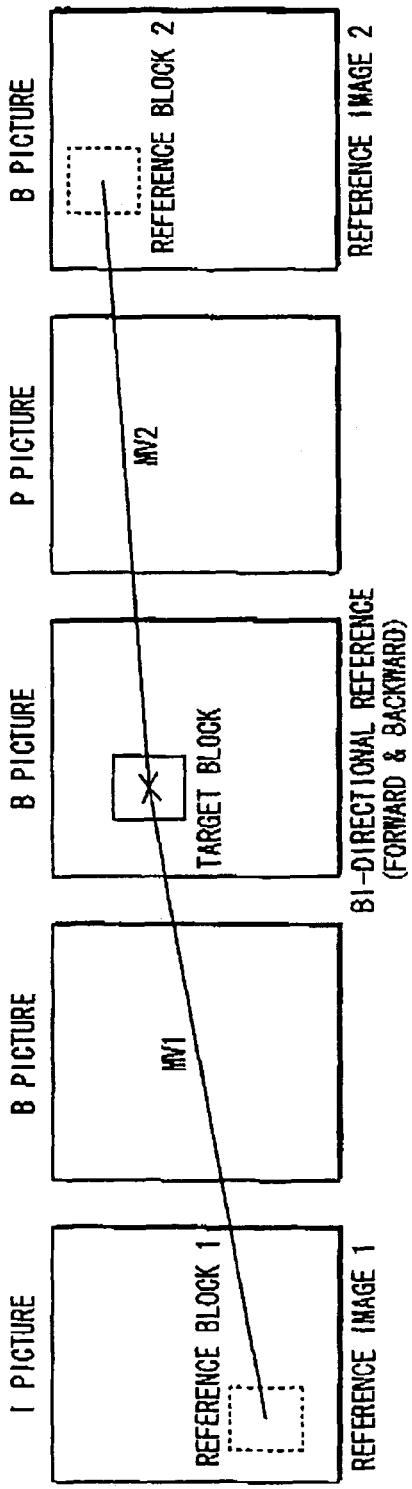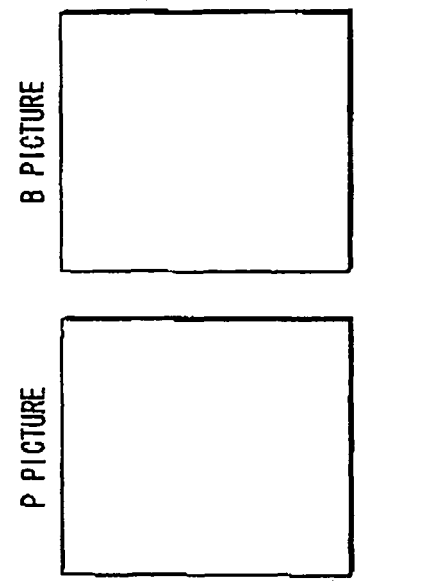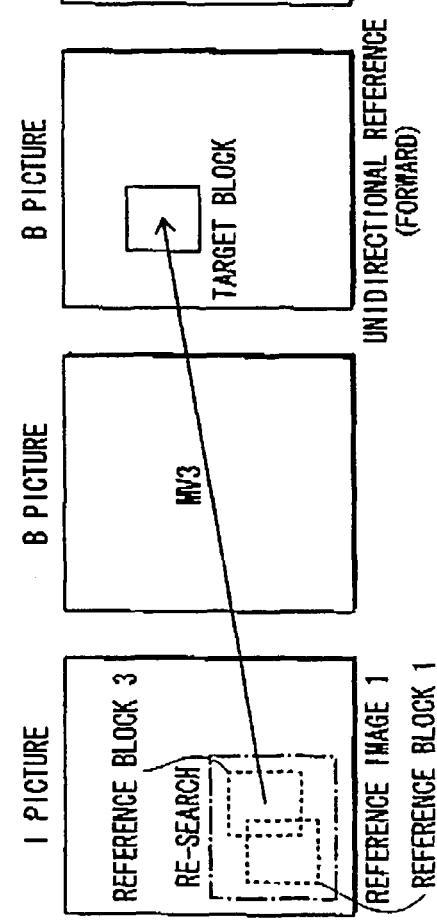
FIG. 12A
FIG. 12B

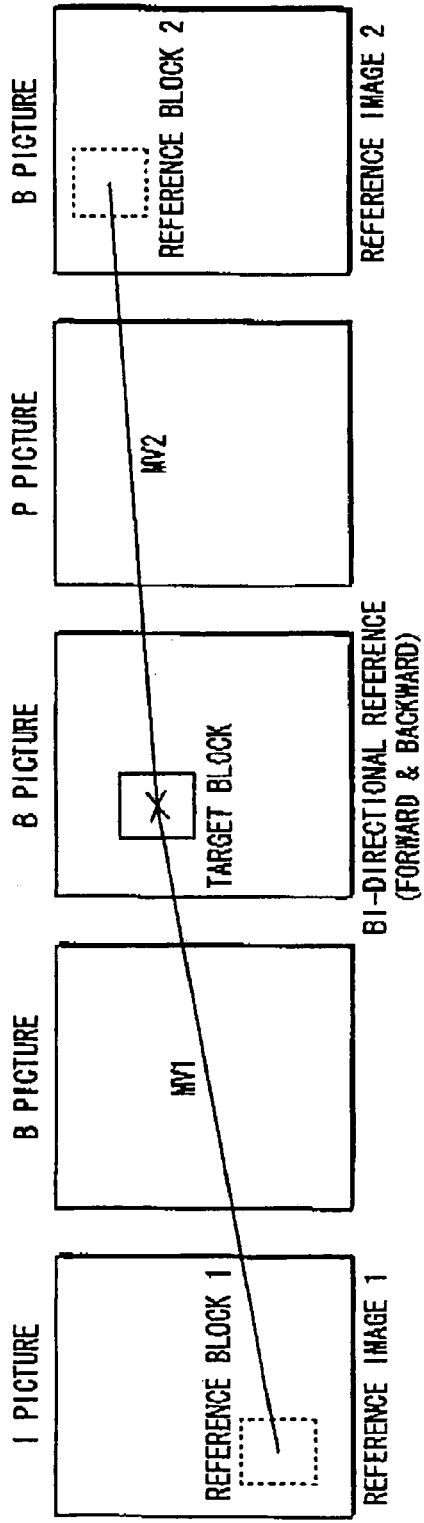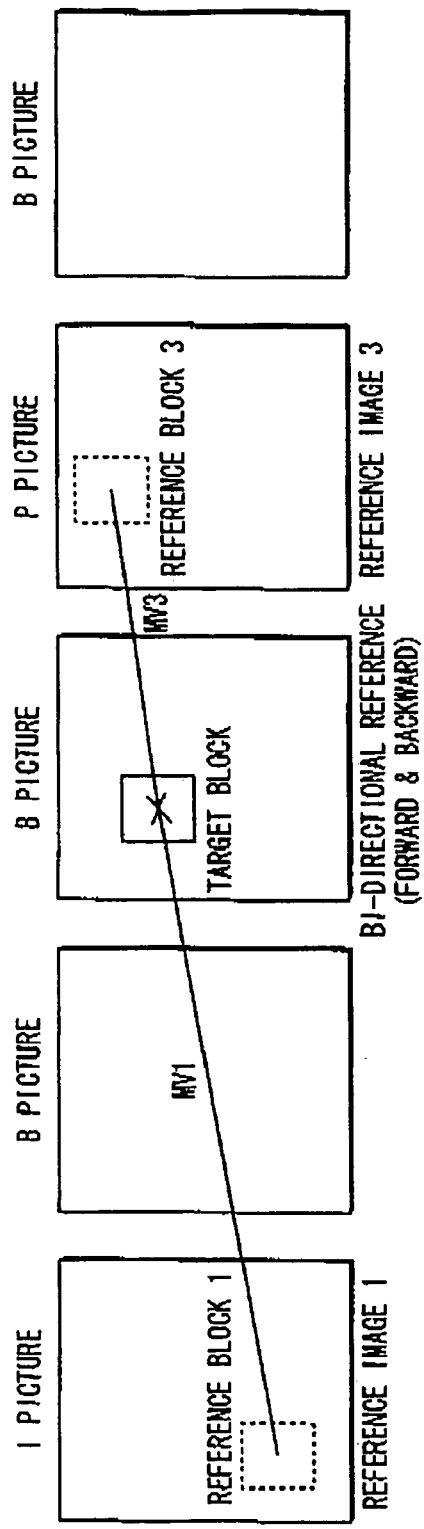

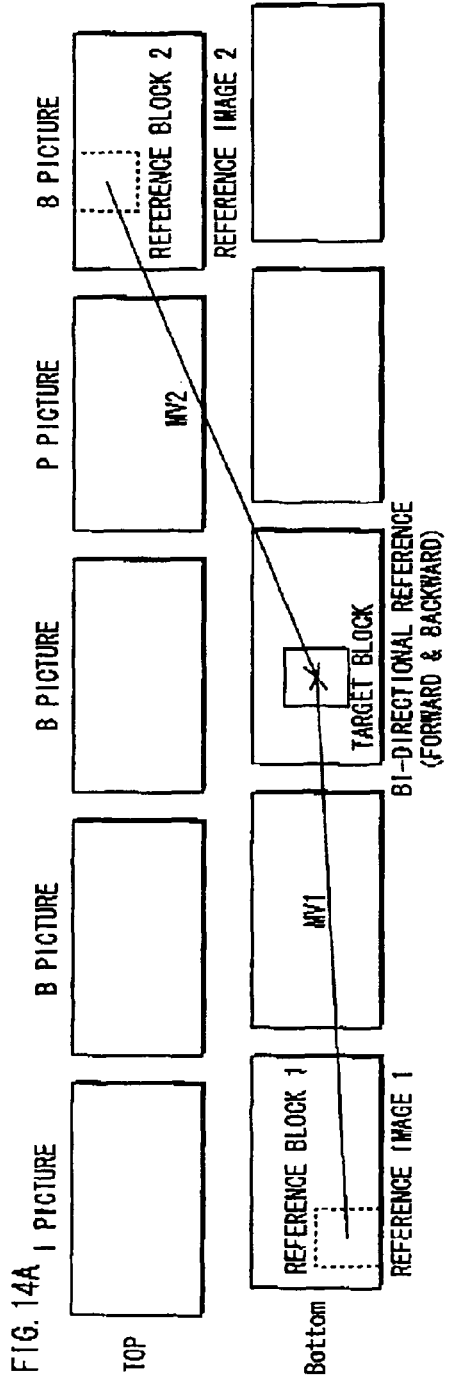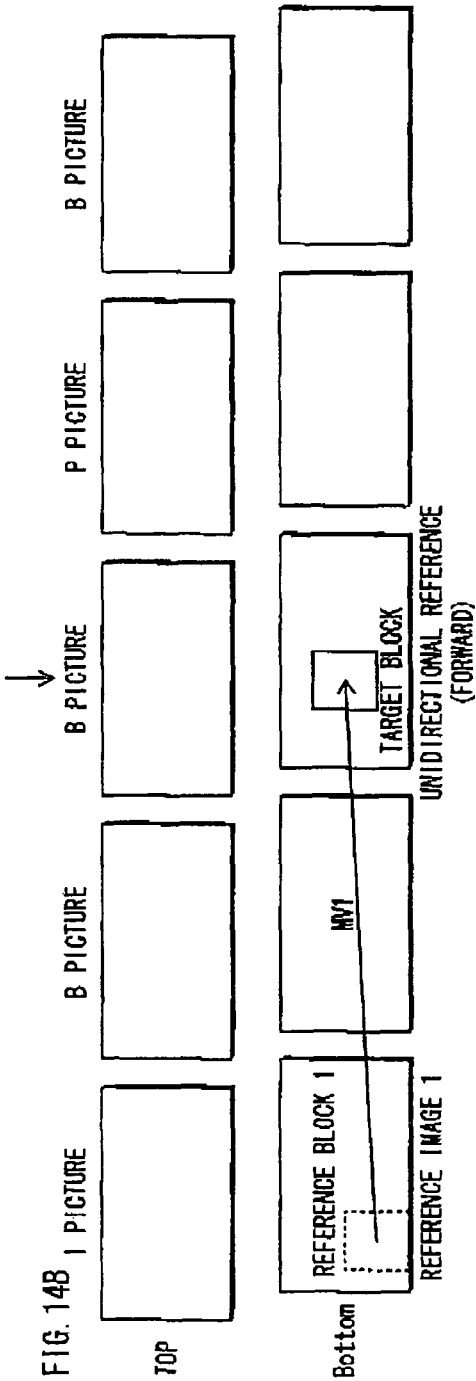

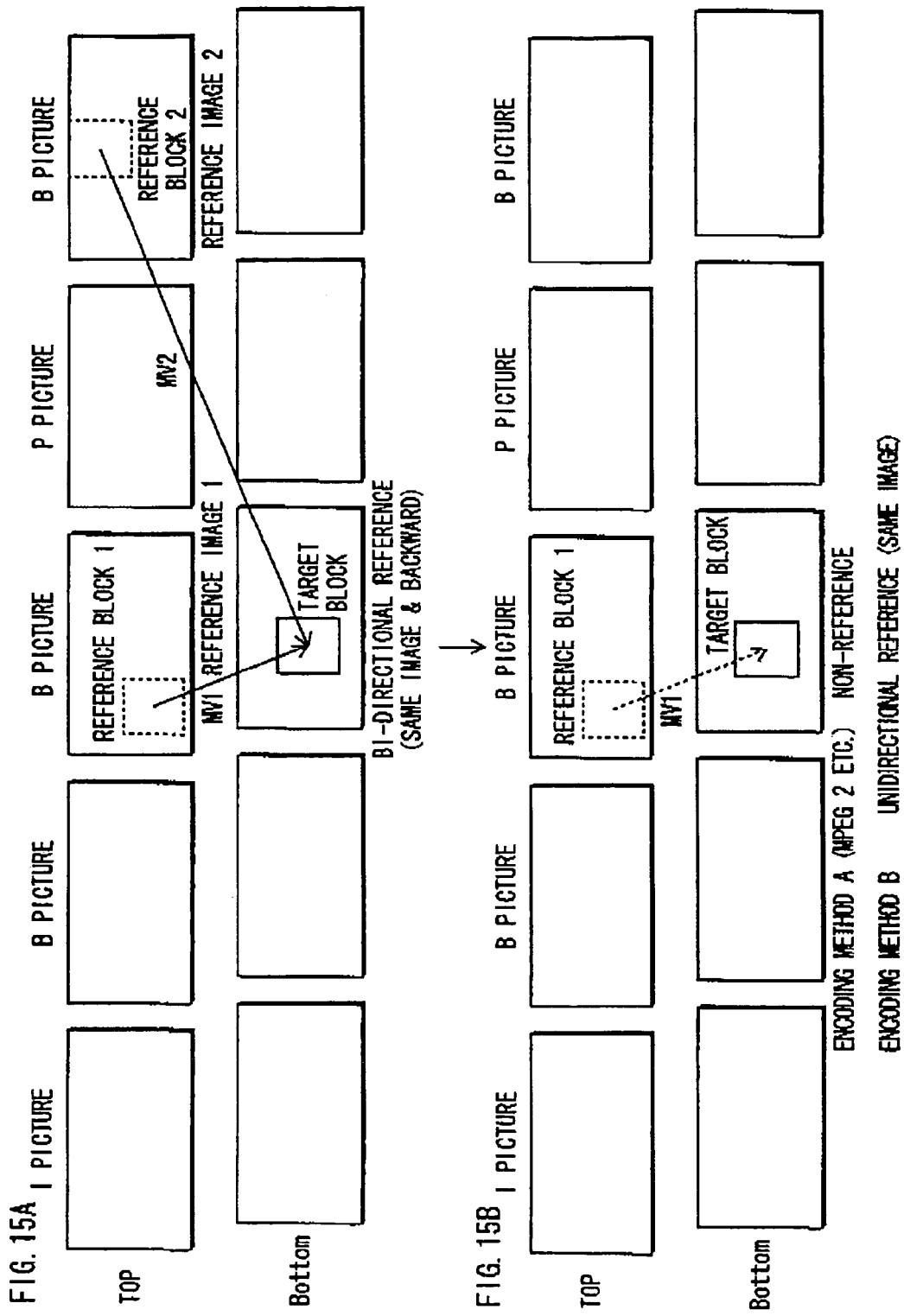

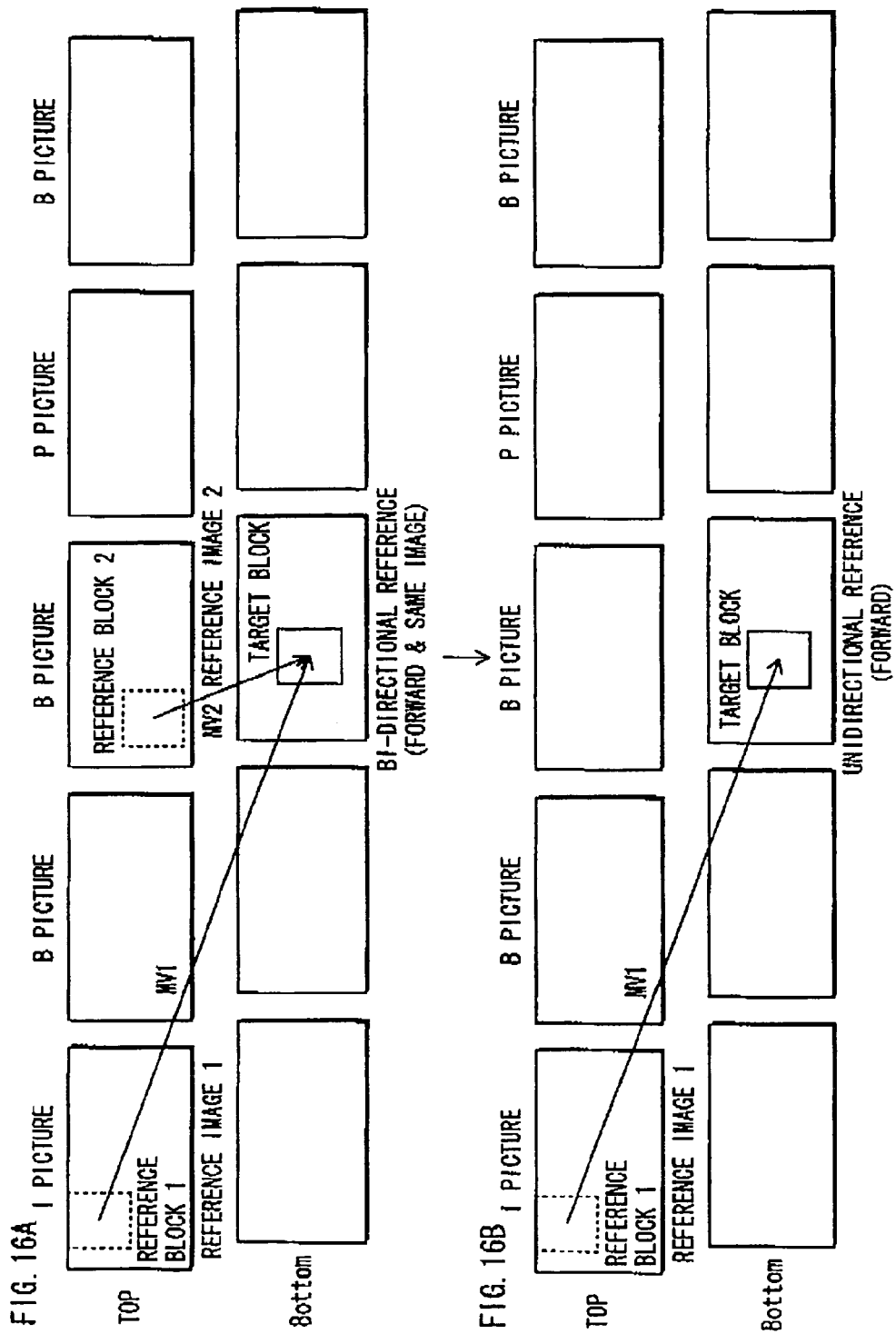

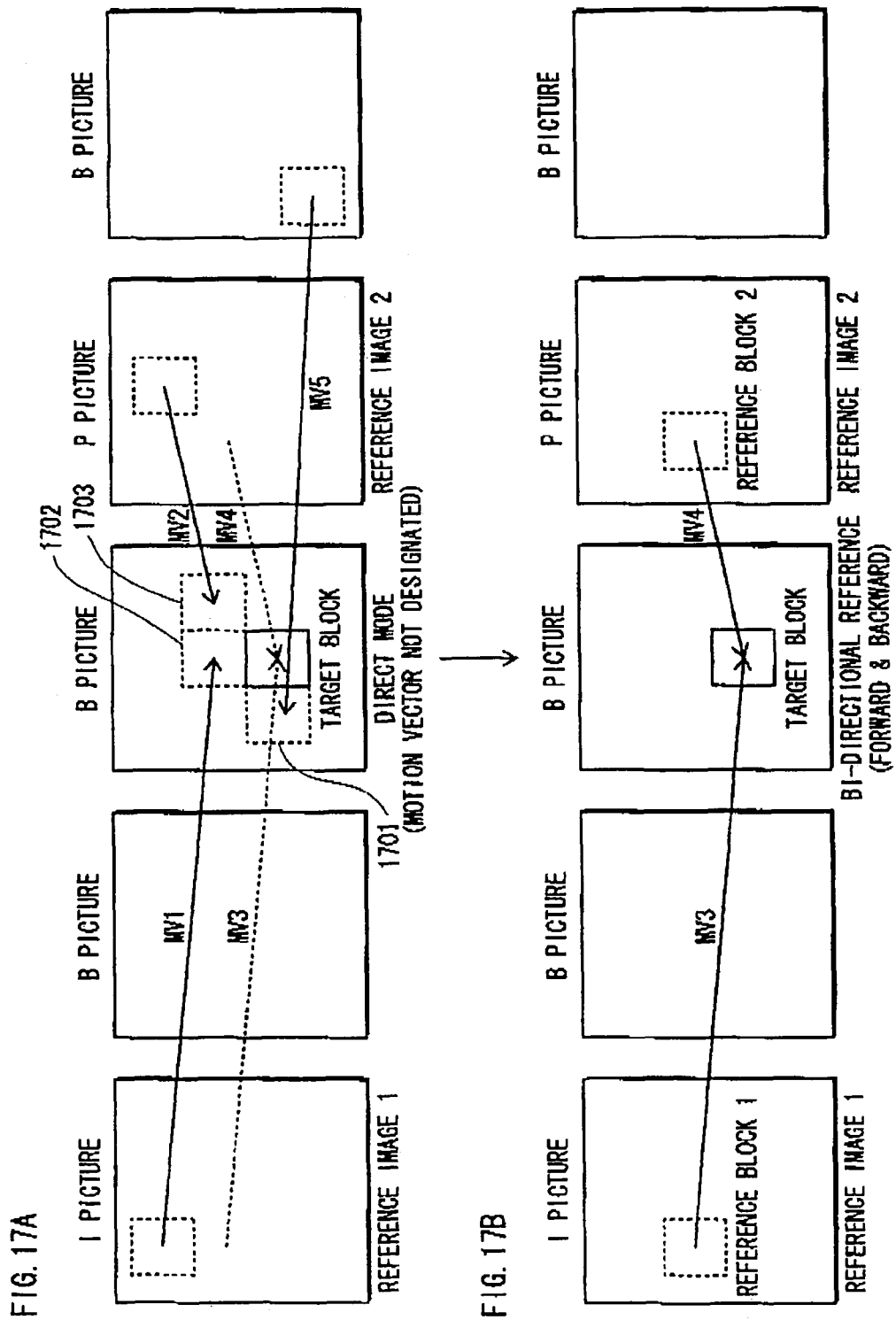

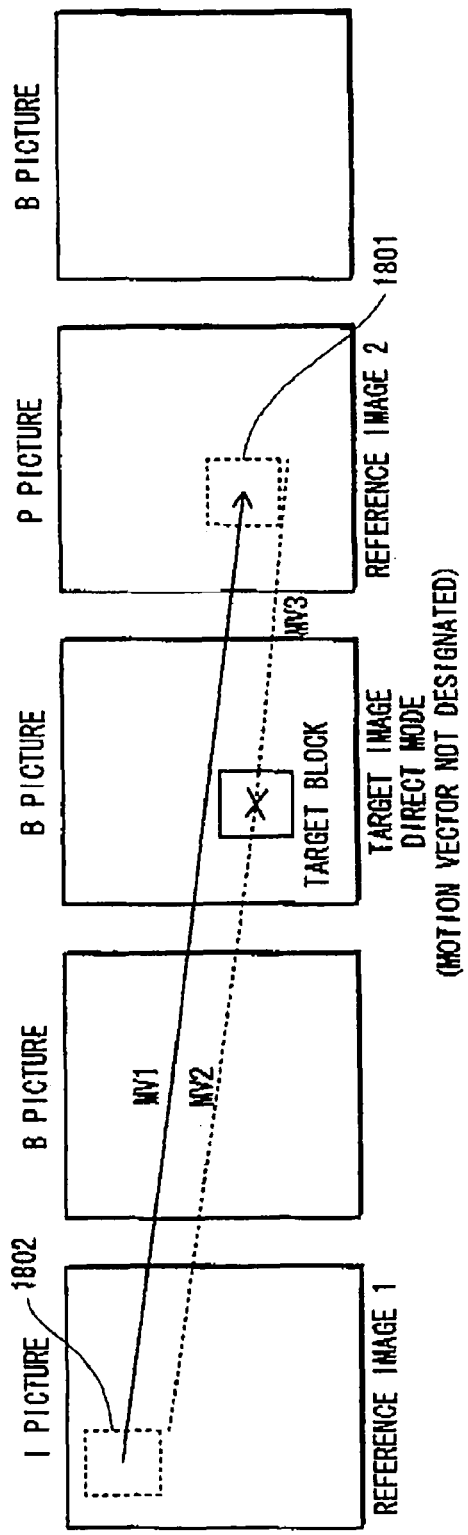
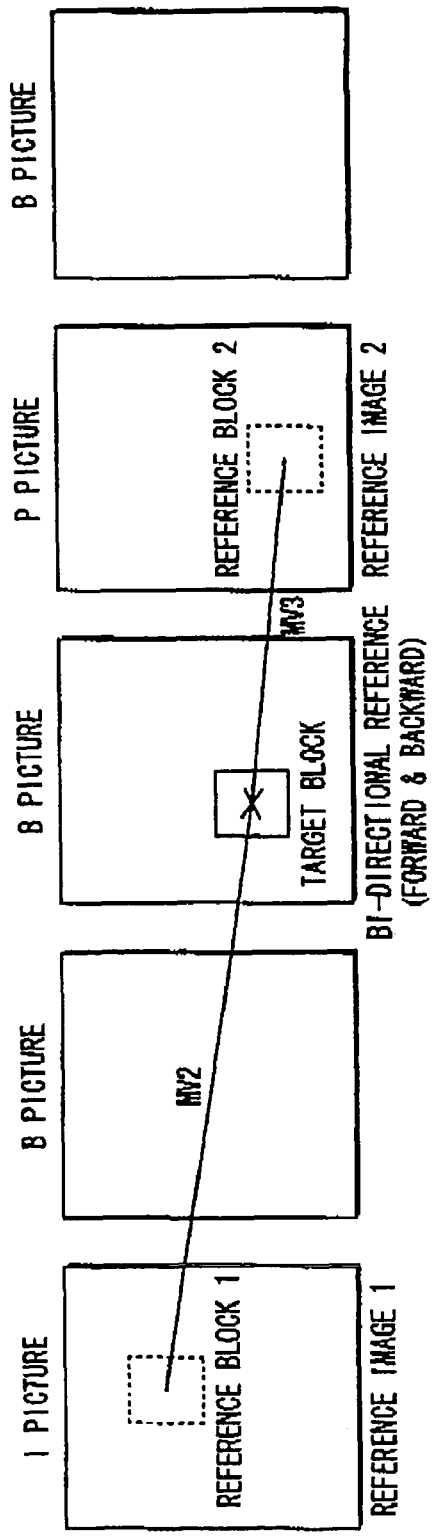

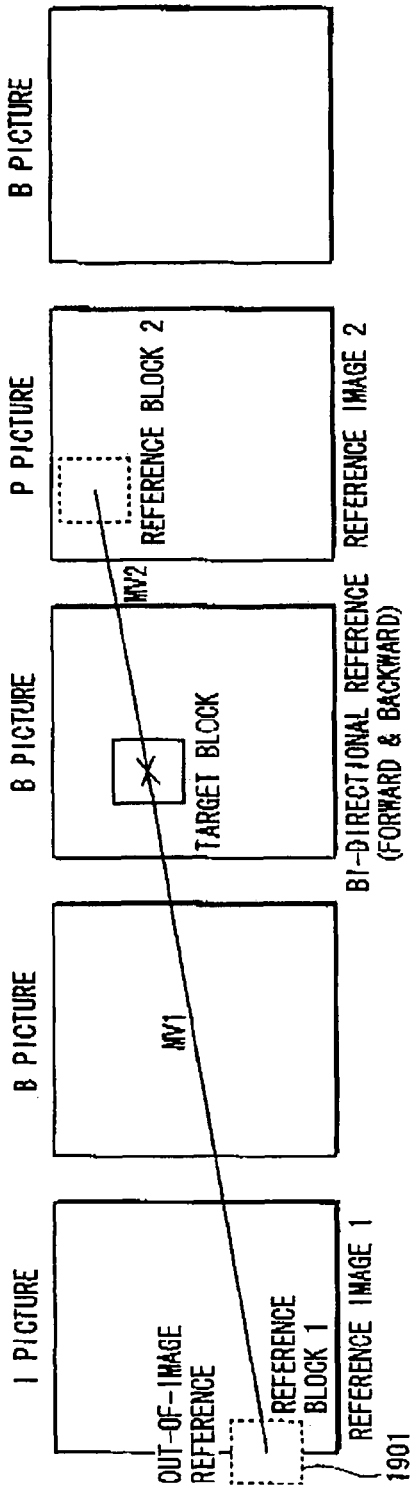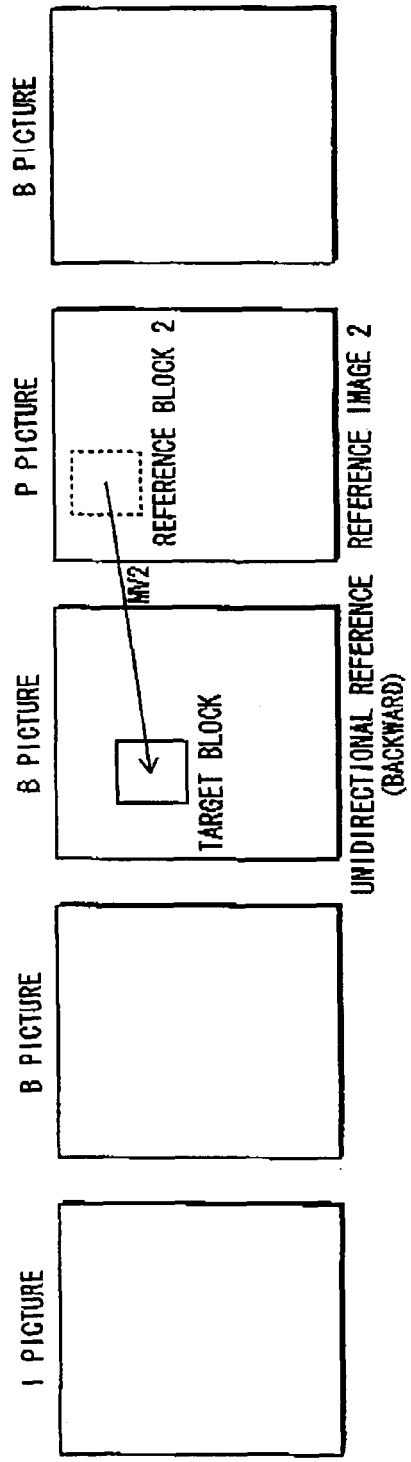

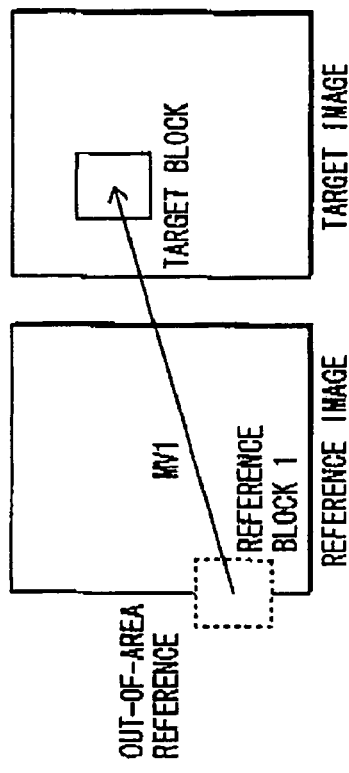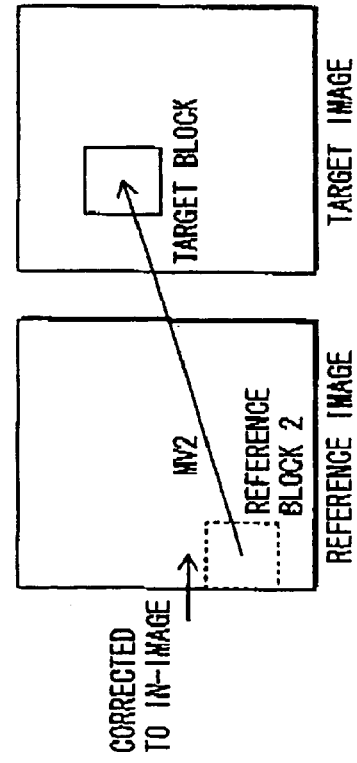
FIG. 20A
FIG. 20B

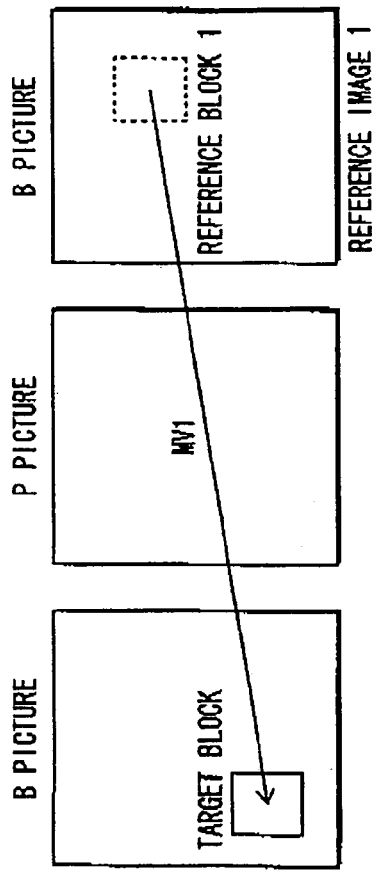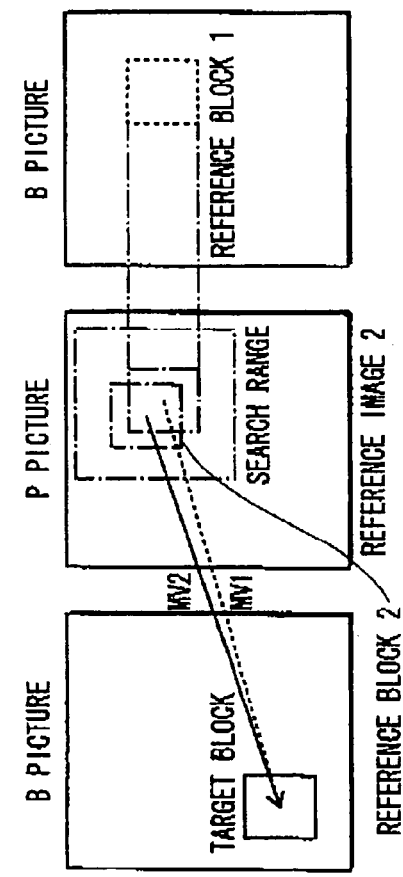
FIG. 21A
FIG. 21B

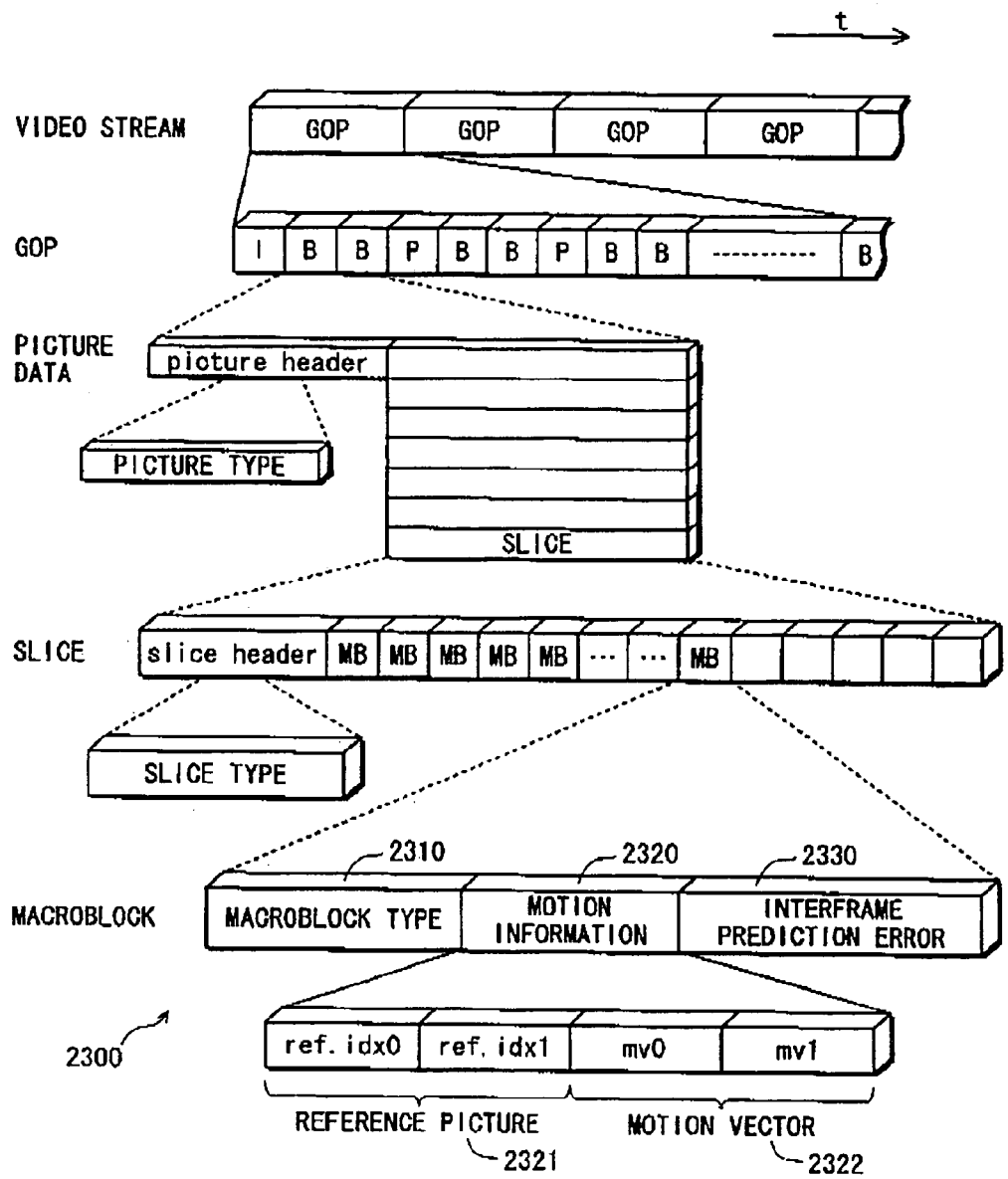

FIG. 24

| (0, 0) | (1, 0) | (2, 0) | (3, 0) | (4, 0) | (5, 0) | | (i, 0) |
|---|---|---|---|---|---|---|---|
| (0, 1) | (1, 1) | (2, 1) | (3, 1) | (4, 1) | (5, 1) | | (i, 1) |
| (0, 2) | (1, 2) | (2, 2) | (3, 2) | (4, 2) | (5, 2) | | (i, 2) |
| (0, 3) | (1, 3) | (2, 3) | (3, 3) | (4, 3) | (5, 3) | | (i, 3) |
| (0, 4) | (1, 4) | (2, 4) | (3, 4) | (4, 4) | (5, 4) | | (i, 4) |
| (0, 5) | (1, 5) | (2, 5) | (3, 5) | (4, 5) | (5, 5) | | (i, 5) |
| (0, j) | (1, j) | (2, j) | (3, j) | (4, j) | (5, j) | | (i, j) |

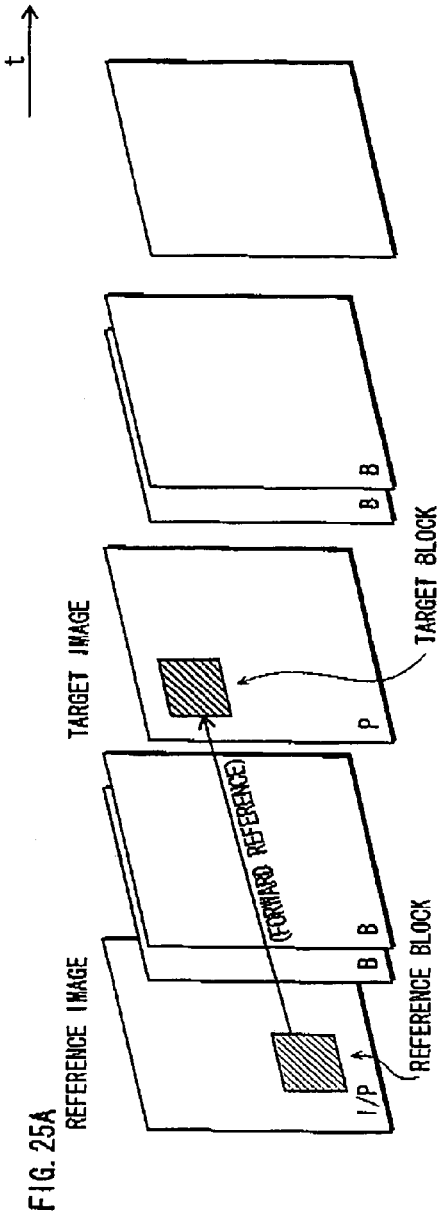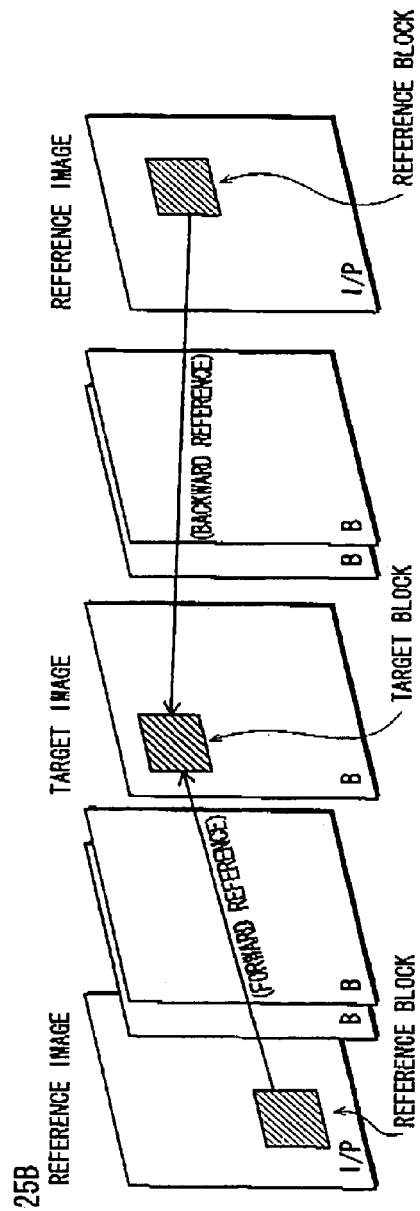

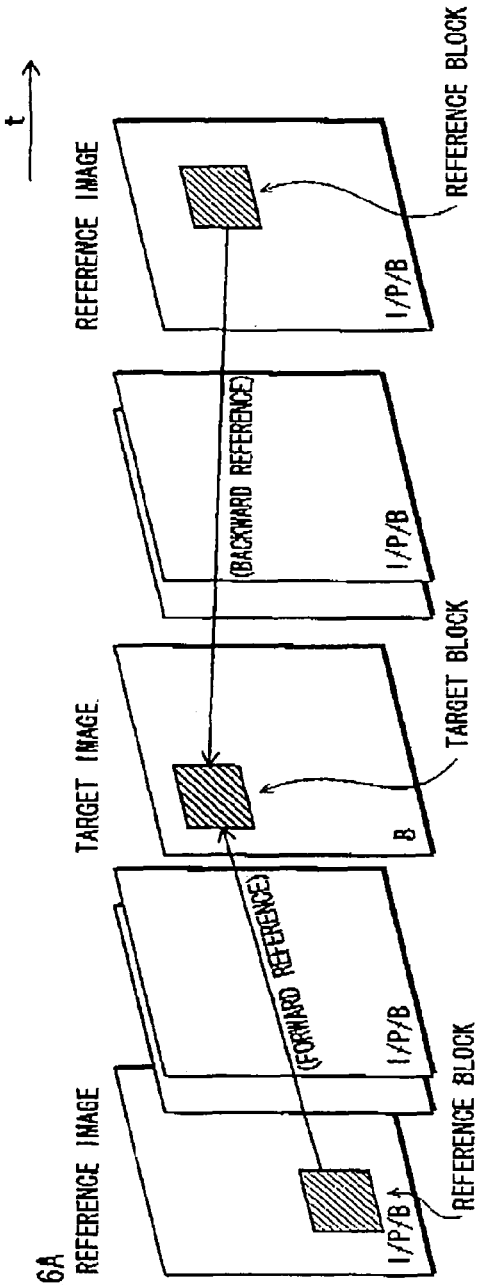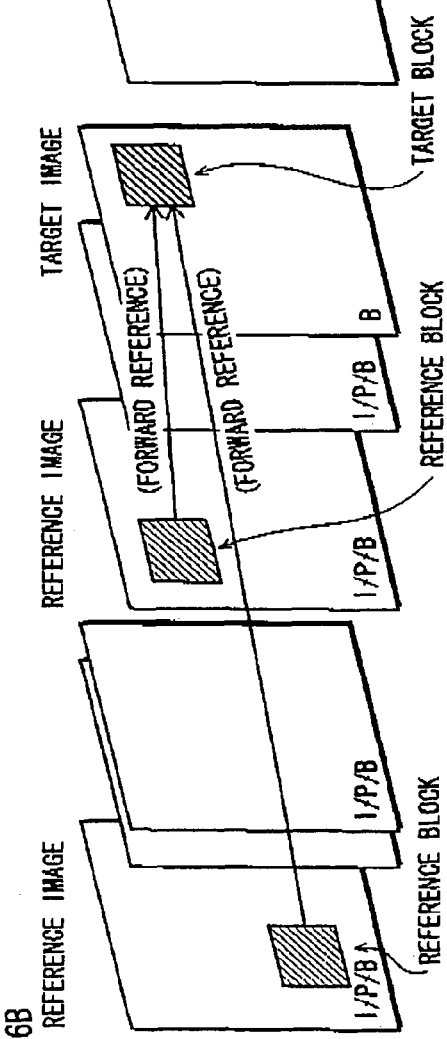
FIG. 26A
FIG. 26B

FIG. 28A

| DISPLAY SEQUENCE | PICTURE TYPE | STORAGE ADDRESS |
|---|---|---|
| 6 | B | addr_P06 |
| ⁓ | ⁓ | ⁓ |
| 2 | I | addr_P02 |
| 1 | P | addr_P01 |

FIG. 28B

| MACROBLOCK LOCATION | ADDRESS |
|---|---|
| (0, 0) | addr 00 |
| (0, 1) | addr 01 |
| (0, 2) | addr 02 |
| ⋮ | ⋮ |
| (i, j) | addr ij |

MOVING PICTURE CONVERSION APPARATUS

BACKGROUND OF THE INVENTION (1) Field of the Invention

The present invention relates to a moving picture conversion apparatus that converts encoded moving picture code strings, and in particular to improving efficiency of conversion to moving picture code strings encoded with a different motion compensated prediction method.

(2) Description of the Related Art

With advances in digitization of moving pictures in recent years, moving pictures are now able to be transmitted over the Internet and the like as digital data, and recorded in storage media.

The size of such moving picture data has escalated in order to meet demands with respect to color, resolution, and smoothness of motion of moving pictures, and while the speed of communication networks and the capacity of storage media have increased, techniques to compress moving picture data are still necessary.

Encoding compression methods such as the MPEG-2 standard and the MPEG-4 standard have been developed in response to such needs. The MPEG-2 standard aims to implement high picture quality in television broadcasting ranging from existing television through to high-vision television, while the MPEG-4 standard aims to implement a high compression rate for mobile and Internet usage and the like.

Although these two standards have different uses in accordance with their respective features, it is desirable from the user's point of view that moving pictures are able to be converted between the standards. As one example, if a television program recorded in MPEG-2 is converted to MPEG-4 data, the television program can be viewed in a mobile playback apparatus.

Ordinarily, such data conversion is carried out by completely decoding pre-conversion data such as data encoded according to MPEG-2, and then re-encoding the decoded moving pictures in a post-conversion format such as MPEG-4.

This conversion method, while having the advantage of being able to be implemented by simply connecting a conventional encoder and decoder, is considerably inconvenient for a user who is accustomed to high-speed dubbing from an HDD (hard disk drive) to a DVD (digital versatile disk), due to the fact that the time taken for conversion is essentially the same as the playback time of the moving picture.

In view of this problem, the time taken for such data conversion is reduced by reusing part of the pre-conversion encoded data.

This conversion method works on the assumption that pre-conversion encoding processing and post-conversion encoding processing are essentially the same. For instance, motion vectors may be reused in conversion of data from a MPEG-2 to MPEG-4, which is the higher standard, in order to cut the time required for motion vector search processing, and consequently reduce the conversion time significantly.

However, there is a problem in the opposite case, in other words, in conversion of data from MPEG-4 to MPEG-2, that motion vectors cannot always be reused.

This occurs because MPEG-2 does not support all the stipulations regarding block size, motion vectors and the like that the higher MPEG-4 standard supports. Specifically, the only block size supported by MPEG-2 is 16 pixels×16 pixels, whereas MPEG-4 also supports blocks of 8 pixels×8 pixels.

Furthermore, while MPEG-2 allows motion vectors only up to half-pixel accuracy, quarter-pixel accuracy is allowed in MPEG-4.

A technique has been developed for carrying out data conversion that resolves these differences (see Japanese Laid-Open Patent Application H11-275592). A brief description thereof is as follows. Data conversion is realized by calculating one motion vector of a 16 pixel×16 pixel block from four motion vectors obtained from four corresponding 8 pixel×8 pixel blocks, then re-searching in a vicinity of the motion vector at quarter-pixel precision to find a motion vector at half-pixel precision for use.

In addition to the MPEG-2 standard and the MPEG-4 standard, an MPEG-4/AVC standard has been newly standardized (see ITU-T H.264 Standard) in which encoding processing is basically the same as in MPEG-2 and MPEG-4.

The MPEG-4/AVC standard has applications ranging from television broadcasting and the like to which MPEG-2 is directed, through to mobile, Internet and the like to which MPEG-4 is directed. MPEG-4/AVC is a scalable standard that is capable of dealing with images of QCIF (quarter CIP) size (180 pixels×144 lines) through to HD (high definition) size (1920 pixels×1080 lines), and also is able to realize an extremely high compression rate compared to the other standards.

Consequently, it is anticipated that with more wide-spread use of MPEG-4/AVC, there will be heightened demand for moving picture conversion apparatuses that convert moving pictures between the MPEG-4/AVC standard and the MPEG-2 standard, which has a high affinity with products such as conventional DVDs, and the MPEG-4/AVC standard and the MPEG-4 standard.

However, due to the-fact that the MPEG-4/AVC standard differs in part from the MPEG-4 standard, the described technique does not enable data conversion from MPEG-4/AVC to MPEG-2, and hence, does not enable a reduction of the time taken for conversion processing in such a case.

SUMMARY OF THE INVENTION

In view of the stated problem, the present invention has an object of providing a moving picture conversion apparatus that is capable of reducing the time taken for data conversion between different encoding methods such as from the MPEG-4/AVC standard to the MPEG-2 standard and the MPEG-4/AVC standard to the MPEG-4 standard.

In order to achieve the stated object, the present invention is a moving picture conversion apparatus that converts first moving picture data, which has been encoded according to a first motion compensated prediction method, into second moving picture data of a same format as data that has been encoded according to a second motion compensated prediction method, the moving picture conversion apparatus including: a selection unit operable to select, from among one or more motion vectors of a block in the first moving picture data, at least one motion vector that fulfills a condition that is to be fulfilled by one or more motion vectors of the block in the second motion compensated prediction method; and an encoding unit operable to perform encoding that complies with the second motion compensated prediction method, wherein the encoding unit encodes the block with use of the selected motion vector.

When the moving picture conversion apparatus having the stated structure has, selected a motion vector or vectors of a block encoded with a pre-conversion encoding method fulfilling the condition of the post-conversion encoding method, the moving picture conversion apparatus performs encoding in accordance with the post-conversion encoding method using the selected pre-conversion motion vector or vectors. This eliminates the need to find motion vectors according to a conversional motion search, and reduces the processing time for data conversion.

Furthermore, in the encoding of the block, the encoding unit may use the selected motion vector instead of using a motion vector specified by motion searching.

According to the stated structure, pre-conversion motion vector or vectors can he used without any motion searching whatsoever. This considerably reduces in the time taken for conversion processing.

Furthermore, in the encoding of the block, the encoding unit may perform motion searching in a predetermined search range that includes the reference block shown by the selected motion vector and that is based on a location, in a reference image, indicated by the selected motion vector, and encode the block with use of the motion vector obtained as a result of the searching instead of with use of the selected motion vector.

According to the stated structure, a motion vector or vectors are found by searching only a predetermined range with respect to the pre-conversion motion vector or vectors. This narrows the search range compared to a conventional structure that searches a wide range without relying on the motion vectors, and therefore the amount of calculation relating to searching can be reduced. This considerably reduces the time taken for conversion processing.

Furthermore, the condition that the selected motion vector is to fulfill may be a restriction of an encoding type of a reference image of the block, and the selection unit may select the motion vector that fulfills the condition.

Furthermore, the condition that the selected motion vector is to fulfill may be a restriction of an encoding type of a reference image of the block, and the selection unit, when a motion vector among the one or more motion vectors of the block included in the first moving picture data indicates a reference image that does not fulfill the condition, may substitute the reference image with another reference image that fulfills the condition, and select the motion vector.

According to the stated structure, a reference block that is in a reference image permitted to be referenced in the post-conversion encoding method is used as a prediction signal, or a reference block in another image that is permitted to be referenced in the post-conversion encoding method is used as the prediction signal. This eliminates calculation for motion vector searching, and reduces processing time.

Furthermore, in the encoding of the block, the encoding unit may perform motion searching in a predetermined search range that includes the reference block shown by the selected motion vector and that is based on a location, in a reference image, indicated by the selected motion vector, and encode the block with use of the motion vector obtained as a result of the searching instead of with use of the selected motion vector.

According to the stated structure, a motion vector or vectors are found by searching a predetermined search range or ranges, in another reference image or images permitted to be referenced, based on a motion vector or vectors in the pre-conversion first moving picture. This narrows down the search range in cases in which a motion vector is to be newly found, and reduces processing time.

Furthermore, the condition that the selected motion vector is to fulfill may be that, if a total number of motion vectors of the block is one, a reference image of the one motion vector is an image displayed before an image in which the block is included, and when one of the one or more motion vectors of the block in the first moving image data fulfill the condition, the selection unit may select the one of the one or more motion vectors.

Furthermore, the condition that the selected motion vector is to fulfill may be that, if a total number of motion vectors of the block is two, a reference image of one of the two motion vectors is an image displayed before the image in which the block is included and a reference image of the other of the two motion vectors is an image displayed after the image in which the block is included, and when two of the one or more motion vectors of the block in the first moving image data fulfill the condition, the selection unit may select the two of the one or more motion vectors.

Furthermore, the condition that the selected motion vector is to fulfill may be that, in a display sequence of images, an image whose encoding type is a predetermined type exists between the image that includes the block and a reference image of the block, and when a motion vector among the one or more motion vectors of the block in the first moving image data indicates a reference image that fulfills the condition, the selection unit may select the motion vector.

Furthermore, the condition that the selected motion vector is to fulfill may be that each of one or more reference images of the block is one of (i) an image that, in a display time order, is a nearest past P picture or I picture with respect to the image in which the block is included, (ii) an image that, in the display time order, is a nearest future P picture or I picture with respect to the image in which the block is included, and (iii) the image in which the block is included, and when a motion vector among the one or more motion vectors of the block in the first moving image data indicates a reference image that fulfills the condition, the selection unit may select the motion vector.

Furthermore, when a total number of motion vectors of the block in the first moving image data is two and the selection unit selects only one of the two motion vectors, the encoding unit may perform encoding with use of the one motion vector, and modify information that shows a motion prediction type of the block from showing a motion prediction type that uses two motion vectors to showing a motion prediction type that uses one motion vector.

Furthermore, the condition may be that any given reference block of the block exists entirely within the reference image in which the reference block is included, and when a motion vector among the one or more motion vectors of the block in the first moving image data indicates a reference image that fulfills the condition, the selection unit may select the motion vector.

Furthermore, when a motion vector exists that has not been selected by the selection unit among the one or more motion vectors of the block, if, by correcting the motion vector that has not been selected, the reference block of a resultant corrected motion vector exists entirely within the reference image, the selection unit may select the resultant corrected motion vector.

According to the stated structure, a motion vector or vectors, among the pre-conversion motion vector or vectors, that conform to the post-conversion encoding method can be selected. Therefore, encoding can be performed reusing the selected motion vector or vectors.

Furthermore, the first motion prediction compensation method may comply with an MPEG-4/AVC standard.

According to the stated structure, data encoded in accordance with the MPEG-4/AVC standard can be converted to the same format as the format of data encoded in accordance with another standard.

Furthermore, the second motion prediction compensation method may comply with one of an MPEG-2 standard and an MPEG-4 standard.

According to the stated structure, data encoded in accordance with the MPEG-4/AVC standard can be converted to the same format as the format of data encoded in accordance with the MPEG-2 standard.

Furthermore, the present invention is a moving picture conversion method that converts first moving picture data, which has been encoded according to a first motion compensated prediction method, into second moving picture data of a same format as data that has been encoded according to a second motion compensated prediction method, the moving picture conversion method including the steps of a selection step of selecting, from among one or more motion vectors of a block in the first moving picture data, at least one motion vector that fulfills a condition that is to be fulfilled by one or more motion vectors of the block in the second motion compensated prediction method; and an encoding step of performing encoding that complies with the second motion compensated prediction method, wherein the encoding step encodes the block with use of the selected motion vector.

Furthermore, the present invention is a computer program for causing an apparatus capable of executing the computer program to perform moving picture conversion processing converts first moving picture data, which has been encoded according to a first motion compensated prediction method, into second moving picture data of a same format as data that has been encoded according to a second motion compensated prediction method, the computer program including the steps of: a selection step of selecting, from among one or more motion vectors of a block in the first moving picture data, at least one motion vector that fulfills a condition that is to be fulfilled by one or more motion vectors of the block in the second motion compensated prediction method; and an encoding step of performing encoding that complies with the second motion compensated prediction method, wherein the encoding step encodes the block with use of the selected motion vector.

Furthermore, the present invention is a computer-readable recording medium on which is recorded a computer program, the computer program causing an apparatus capable of executing the computer program to perform moving picture conversion processing converts first moving picture data, which has been encoded according to a first motion compensated prediction method, into second moving picture data of a same format as data that has been encoded according to a second motion compensated prediction method, the computer program including the steps of: a selection step of selecting, from among one or more motion vectors of a block in the first moving picture data, at least one motion vector that fulfills a condition that is to be fulfilled by one or more motion vectors of the block in the second motion compensated prediction method; and an encoding step of performing encoding that complies with the second motion compensated prediction method, wherein the encoding stop encodes the block with use of the selected motion vector.

Furthermore, the present invention is an integrated circuit in a moving picture conversion apparatus that converts first moving picture data, which has been encoded according to a first motion compensated prediction method, into second moving picture data of a same format as data that has been encoded according to a second motion compensated prediction method, the integrated circuit including a selection unit operable to select, from among one or more motion vectors of a block in the first moving picture data, at least one motion vector that fulfills a condition that is to be fulfilled by one or more motion vectors of the block in the second motion compensated prediction method: and an encoding unit operable to perform encoding that complies with the second motion compensated prediction method, wherein the encoding unit encodes the block with use of the selected motion vector.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 3 is the flowchart (part 2) showing the procedure of the program stored in the program storage unit 32;

FIG. 4 is the flowchart (part 3) showing the procedure of the program stored in the program storage unit 32;

FIGS. 5A and 5B show an example of operations when storing a unidirectional reference;

FIGS. 6A and 6B show an example of operations when a unidirectional reference is changed to a non-interframe reference;

FIGS. 7A and 7B show an example of operations when storing a bi-directional reference;

FIGS. 8A and 8B show an example of operations when a bi-directional reference is changed to a non-interframe reference;

FIGS. 9A and 9B show an example of operations when a bi-directional reference (forward and backward) is changed to a unidirectional reference;

FIGS. 10A and 10B show an example of operations when a bi-directional reference (forward and forward) is changed to a unidirectional reference;

FIGS. 11A and 11B show an example of operations when converting pixel accuracy from ¼ to ½;

FIGS. 12A and 12B show an example of operations in the case of motion vector re-searching;

FIGS. 13A and 13B show an example of operations when a reference image Is changed to an image of a different of picture type;

FIGS. 14A and 14B show an example of operations in the case of interfield reference;

FIGS. 15A and 15B show an example of operations in the case of an interfield reference in a same image;

FIGS. 16A and 16B show an example of operations in the case of an interfield reference;

FIGS. 17A and 17B show an example of operations when spatial direct mode is changed to a bi-directional reference;

FIGS. 18A and 18B show an example of operations when a temporal direct mode is changed to a bi-directional reference;

FIGS. 19A and 19B show an example of operations when referencing an out-of-image block;

FIGS. 20A and 20B show an example of operations when an out-of-image reference block is shifted to within the image;

FIGS. 21A and 21B how an example of re-searching operations when a reference image is changed to an image of a different picture type;

FIG. 23 expresses a structural example of MPEG encoded data;

FIG. 24 shows the relationship between one image and macroblocks;

FIGS. 25A and 25B show an example of an MPEG-2 motion vector;

FIGS. 26A and 26B show an example of MPEG-4/AVC motion vectors;

FIGS. 28A and 28B show an example of tables for managing pictures in the frame memory.

DESCRIPTION OF THE PREFERRED EMBODIMENTS

First Embodiment

Overview

Figure 1:
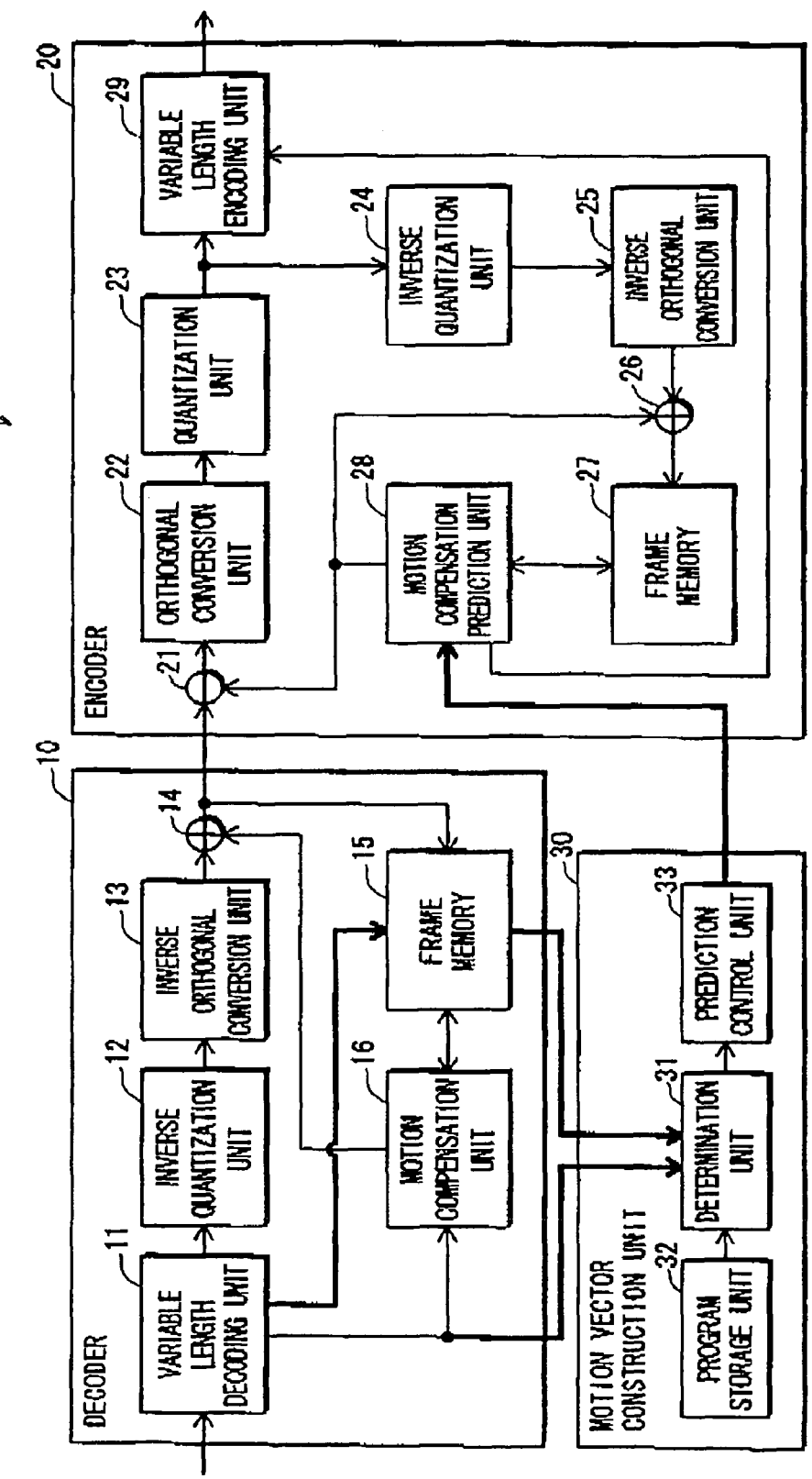
FIG. 1 is a block diagram showing the structure of a moving picture conversion apparatus.

The moving picture conversion apparatus of the present invention converts data encoded in accordance with the MPEG-4/AVC standard to a format of data encoded in accordance with the MPEG-2 standard, a feature of the moving picture conversion apparatus being the reuse of motion vectors in conversion. In view of the fact that these encoding methods have a shared basis for encoding in that they are motion compensated prediction methods, the moving picture conversion apparatus of the present invention reuses motion vectors which are shared components of encoded data.

Since one aspect of MPEG encoding processing is that motion vector searching involves an extremely large amount of processing, a cut in motion vector search processing significantly reduces the time required for encoding processing, and consequently leads to considerably greater convenience.

The following describes the differences in motion vectors in the MPEG-4/AVC standard and the MPEG-2 standard with use of FIG. 23 to FIGS. 26A and 26B.

Differences Between MPEG-4/AVC Standard and MPEG-2 Standard

MPEG-4/AVC and MPEG-2 video streams are described briefly with use of the drawings. Video streams share the same basic form in both standards.

Video Streams

FIG. 23 shows the data structure of a video stream.

The video stream is compressed based on the spatial frequency component of an image, the unit of compression being a number of the pixels of an image. This unit of compression is called a macroblock, and one image is composed of a plurality of macroblocks. FIG. 24 shows the structure of one image composed of macroblocks (0,0) to (i,j).

A macroblock is composed of, as one example, 16 pixels× 16 pixels, and an image is also processed in macroblock units in decoding.

The first level in FIG. 23 shows the structure of a video stream.

The video stream is composed of a plurality of GOPs (group of pictures, see first level in FIG. 23). Each GOP includes at least one piece of picture data of three types: I picture, B picture and P picture (expressed by I, P, B in FIG. 23), with an I picture always existing at the top of the GOP (see second level in FIG. 23).

The picture data is composed of a picture header and a plurality of slices (see third level in FIG. 23). The picture header includes a picture type which shows whether the piece of picture data is an I picture, a B picture or a P picture.

In MPEG-4/AVC, instead of the picture type itself being included in the picture header, the types of the slices in the picture are included in the picture header, and the picture type is found from these slice types.

Each slice has a slice header, and a plurality of macroblocks (see fourth level in FIG. 23). The slice header includes the slice type which shows whether the slice is an I slice, a B slice or a P slice.

Slice types exist in MPEG-4/AVC data only. In other words, while a plurality of types of slice exist in one picture-in MPEG-4/AVC, only one slice type exists in one picture in MPEG-2.

A macroblock 2300 is composed of a macroblock type 2130, motion information 2320, and an interframe prediction error 2330.

The macroblock type 2310 expresses information such as whether or not the macroblock requires interframe prediction, and whether unidirectional reference or bi-directional reference is used. The format of the motion information differs depending on the macroblock type.

The motion information 2320 is composed of one or more reference pictures 2321 that each specify a picture to be referenced, and one or more motion vectors 2322.

The example in FIG. 23 is of motion information for a bi-directional reference. Here, "ref.idx0" and "ref.idx1" are numbers that each show a reference picture, and "mv0" and "mv1" express motion vectors in the respective reference pictures.

Note that this particular example is of motion information in the MPEG-4/AVC standard. Numbers "ref.idx0" and the like showing reference pictures do not exist in tho MPEG-2 standard because only predetermined pictures can be referenced, and therefore it is unnecessary for such numbers to be included as data.

In the present invention, since the MPEG-4/AVC motion vectors are reused to create MPEG-2 motion vectors, the macroblock type and the reference picture arc changed depending on the motion vector that can be used.

The interframe prediction error 2330 expresses a difference between a reference image and a target image.

I/P/B Pictures

An I picture is an image obtained by encoding using only information within the image itself, a P picture is an image obtained according to unidirectional prediction encoding with one image, and a B picture is an image obtained according to bi-directional prediction encoding with two images.

Furthermore, all macroblocks included in an I picture are (1) macroblocks that can be obtained only with information in the image itself. P pictures are composed of (1) macroblocks that can be obtained only with information in the image itself, and (2) macroblocks obtained according to unidirectional prediction encoding with one image. B pictures are composed of (1) macroblocks that can be obtained only with information in the image itself, (2) macroblocks obtained according to unidirectional prediction encoding with one image, and (3) macroblocks obtained according to bi-directional prediction encoding with two images. It is the macroblock types that express these types (see FIG. 23).

Since there is a difference in which of these macroblock types are supported by MPEG-4/AVC and MPEG-2, an object of the present invention can be said to be resolving this difference. Details of this difference are given in "Motion vector differences" below.

Furthermore, in MPEG-4/AVC, each I/P/B slice is composed of macroblocks of the same types as the pictures described above. I pictures are composed of I slices only, P pictures are composed of I slices and P slices, and B pictures are composed of I slices, P slices and B slices. Therefore, since respective picture types have the same type of macroblocks in both MPEG-4/AVC and MPEG-2, the description in the present embodiment is given in terms of pictures.

Note that since in reality pictures are processed is units of a slice in MPEG-4/AVC, the present invention may be implemented in units of a slice.

Motion Vector Differences

The difference in motion vectors in MPEG-4/AVC and MPEG-2 is the freedom of reference image selection. Reference images are selectable from a wider range in MPEG-4/AVC in order to increase the compression rate.

FIGS. 25A and 25B show examples of motion vector in MPEG-2, FIG. 25A being an example of a P picture and FIG. 25B being an example of a B picture. FIGS. 26A and 26B show examples of motion vectors in MPEG-4/AVC, both FIG. 26A and 26B being examples of B pictures. In these drawings, "I/P/B" and the like express I pictures, P pictures or B pictures, and the arrows show a target block from a reference block (this applies to FIGS. 5A and 5B, etc. also).

I pictures are obtained by independently encoding the image using only the image itself and without motion prediction in the time direction, and therefore can be converted between the standards.

It should be noted, however, that although each macroblock in an I picture in MPEG-2 is encodable only with itself (non-reference), an I picture in MPEG-4/AVC may include, in addition to non-reference macroblocks, macroblocks for which a target block is encoded by referencing another macroblock (up-left, up, up-right, left) in the image (intraframe prediction).

Such intraframe prediction-type macroblocks are converted to non-reference-type macroblocks in data conversion. Here, only the target macroblocks need to be encoded, and therefore conversion can be carried out in a relatively short amount of time.

There are three major differences regarding P pictures and B pictures between the two standards.

The first difference is the types of pictures that can be reference images, the second difference is the time distance of pictures that can be reference images, and the third difference is the time direction.

The types of pictures that can be reference images in MPEG-2 are I pictures and P pictures (see FIG. 25A), whereas in MPEG-4/AVC, B pictures can also be reference images (see FIG. 26A)

With respect to the time distance of pictures that can be reference images, in MPEG-2 reference images are limited to nearest pictures in the time order. For example, a reference image of an MPEG-2 P picture must be the nearest past I picture or P picture (see FIG. 25A).

However, in MPEG-4/AVC, a P picture may use a picture among the nearest 16 pictures as reference images, and a B picture may, for example, use pictures among the 16 past and 16 future pictures as reference images (see FIG. 26A).

Furthermore, as a time direction restriction, it is necessary to select one reference image in each of the forward direction and the backward direction for a B picture in MPEG-2. For example, it is necessary in MPEG-2 that one of the two motion vectors relating to a B picture uses a reference image that is the nearest past P picture or I picture in time order, and the other of the two motion vectors relating to the B picture uses a reference image that is the nearest future P picture or I picture in time order (see FIG. 25B).

However, in MPEG-4/AVC it is possible to select two reference pictures from the forward direction or two reference pictures from the backward direction (see FIG. 26B).

Table 1 below summarizes differences between MPEG-4/AVC and MPEG-2 in terms of macroblocks.

Note that in Table 1, "forward" means forward referencing that references a picture forward in the time order, and "backward" means backward referencing that references a picture backward in the time order.

TABLE 1

| | Macroblock types | |
|---|---|---|
| Picture | MPEG-4/AVC | MPEG-2 |
| I | Non-reference Intraframe prediction | Non-reference |
| P | Non-reference Intraframe prediction | Non-reference |
| | Interframe prediction Unidirectional reference: forward backward | Interframe prediction Unidirectional reference: forward |
| B | Non-reference Intraframe prediction | Non-reference |
| | Interframe prediction Unidirectional reference: forward backward | Interframe prediction Unidirectional reference: forward |
| | Bi-directional reference: forward & backward forward & forward backward & backward | Bi-directional reference: forward & backward |

In light of these differences, the present invention performs data conversion by reusing motion vectors.

The following describes the moving picture conversion apparatus of an embodiment of the present invention with use of the drawings.

Functions

FIG. 1 is a block diagram showing the structure of a moving picture conversion apparatus 100.

The moving picture conversion apparatus 100 shown in FIG. 1 converts an MPEG-4/AVC format moving picture input from an external source into an MPEG-2 form at moving picture, and outputs the MPEG-2 format moving picture. The moving picture conversion apparatus 100 is composed of a decoder 10, an encoder 20, and a motion vector construction unit 30.

The decoder 10 has a function of receiving input of and decoding MPEG-4/AVC format moving picture data. The encoder 20 has a function of receiving input of and encoding the moving picture decoded in the decoder 10.

Here, the function units of the decoder 10 have basically the same structure as in a conventional decoder, but the flow of data for performing the processing unique to the present invention (shown by the thick arrows) differs. Details are given later in the description of the motion vector construction unit 30.

A feature of the encoder 20 it that is lacks a function unit for performing motion vector searching. This is because conventional motion vector searching is unnecessary due to the fact that motion vectors are reused.

The motion vector construction unit 30 is provided instead of a function unit for performing motion vector searching.

The motion vector construction unit 30 has a function of determining whether or not motion vectors and the like included in the MPEG-4/AVC format moving picture can be reused, and sending data and instructions to a motion prediction compensation unit 28 in accordance with the result of the determination.

The following first gives a brief description of the structures of the decoder 10 and the encoder 20, and then describes the motion vector construction unit 30.

Decoder 10

The decoder 10 is composed of a variable length decoding unit 11, an inverse quantization unit 12, an inverse orthogonal transformation unit 13, an adder 14, a frame memory 15, and a motion compensation unit 16.

The variable length decoding unit 11 has a function of, upon receiving input of a code string of a moving picture encoded according to the MPEG-4/AVC format from an external source, performing variable length decoding of the code string, and extracting the picture type, the macroblock type, motion information, quantization coefficients and the like from the decoded code string.

The inverse quantization unit 12 and the inverse orthogonal transformation unit 13 have a function of performing inverse quantization and inverse orthogonal transformation with respect to the quantization coefficients of each extracted block, and obtaining pixel data of each block.

The adder 14 has a function of outputting the pixel data of each block either as is or after adding a prediction signal from the motion compensation unit 16, depending on the type of encoding shown by the macroblock type.

The frame memory 15 has a function of storing pixel data that corresponds to images, among the output from the adder 14, to be used as reference images.

The motion compensation unit 16 has a function of finding a prediction signal for a motion compensation predicted block, and outputting the prediction signal to the adder 14. The motion compensation unit 16 finds the prediction signal based on motion information obtained from the variable length decoding unit 11 and a reference image stored in the frame memory 15.

The image data stored in the frame memory 15 is described in detail later in "Frame memory 15 of the Decoder 10".

Encoder 20

The encoder 20 is composed of a subtracter 21, orthogonal transformation unit 22, a quantization unit 23, an inverse quantization unit 24, an inverse orthogonal transformation unit 25, an adder 26, a frame memory 27, a motion compensation prediction unit 28, and a variable length encoding unit 29.

The subtracter 21 has the function of outputting the pixel data of a block input from the adder 14 either as is, or outputting a residual signal obtained by subtracting a prediction signal received from the motion compensation prediction unit 28 from the pixel data of the block.

The orthogonal transformation unit 22 and the a quantization unit 23 have a function of applying orthogonal transformation and quantization to block data from the subtracter 21, and outputting the resultant data.

The inverse quantization unit 24, the inverse orthogonal transformation unit 25 and the adder 27 have a function of reconstructing pixel data of a block by inverse orthogonal transformation, inverse quantization, and addition of a prediction signal, and outputting the result to the frame memory 27.

The frame memory 27 stores a reference image that is the pixel data of the restored block.

The motion compensation prediction unit 28 has a function of finding a prediction signal and motion vector of block that is a target of motion-compensated prediction, outputting tile prediction signal to the subtracter 21 and the adder 26, and the motion vector to the variable length encoding unit 29, Generally the method used by the motion compensation prediction unit 28 to find a motion vector is a method whereby motion vectors are found from a reference image according to motion searching.

However, in addition to this method, the present invention also either uses motion vectors output by the motion construction unit 30 as is, or uses motion vectors found by searching a reference image in the vicinity of an image with respect to the motion vector.

The variable length encoding unit 29 has a function of variable-length encoding the block data output from the quantization unit 23 and the motion vector and encoding mode output from the motion compensation prediction unit 28, and outputting the resultant MPEG-2 format code string.

Frame Memory 15 of the Decoder 10

The following describes reference images stored in the frame memory 15 of the decoder 10, with use of FIGS. 27A to 27C and FIGS. 28A and 28B.

In the present embodiment, the frame memory 15 stores information necessary for the motion vector construction unit 30 to determine whether or not to reuse a motion vector.

Figure 27A:
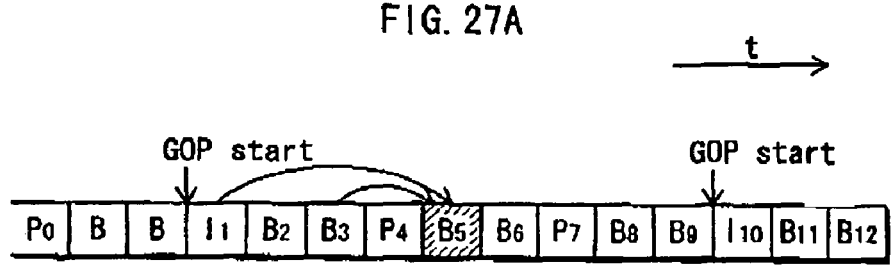
FIGS. 27A, 27B and 27C show the correlation between pictures in a frame memory.
Figure 27B:
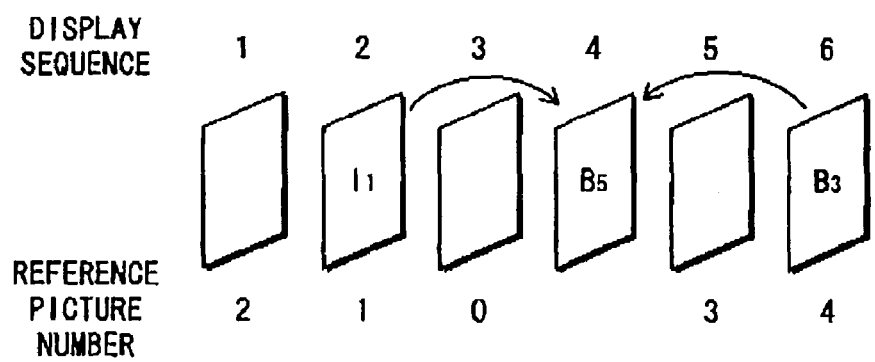
Figure 27C:
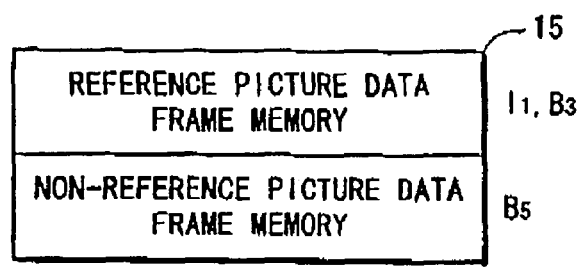

FIGS. 27A to 27C show the relationship between images stored in the frame memory 15.

FIG. 27A expresses a plurality of pictures in a GOP, FIG. 27B expresses a display order of pictures, and FIG. 27C expresses the frame memory 15.

The pictures in the GOP are arranged not in display order in the GOP, but in an order in which they are able to be referenced in decoding. For example, since "B5" uses reference pictures "I1" and "B3", "I1" and "B3" are located before "B5" (see FIG. 27A), but "B5" is displayed before "B3" (see FIG. 27B).

The pictures are decoded in the order in which they are arranged in the GOP and a predetermined number of pictures are stored in the frame memory.

For example if the predetermined number is six, the display sequence is managed with six pictures stored at a time in the frame memory 15, In the case of the target picture being "B5", other pictures are given reference picture numbers in ascending order (see FIG. 27B).

The pictures stored in the frame memory 15 are sorted into reference pictures that are pictures referenced from a proceeding picture, and non-reference pictures that are not referenced from a proceeding picture but are rearranged into the sequence in which they are to be displayed and stored temporarily until they are displayed. For example, B5 is a non-reference picture, and I1 and B3 are reference pictures (see FIG. 27C).

Reference pictures become non-references picture when they are no longer referenced, and are displayed successively is the display sequence.

Each picture is composed of a plurality of decoded macroblocks as shown in FIG. 24, and in addition to this pixel data, stores management data.

FIGS. 28A and 28B show an example of the management data of the reference pictures stored in the frame memory 15.

FIG. 28A expresses an example of a reference picture list 2800.

The reference picture list 2800 manages the reference pictures stored in the frame memory 15, and is stored in the frame memory 15. The reference picture list 2800 is updated each time a picture is displayed or a new picture is stored.

The reference picture list 2800 is composed of a display sequence 2801, a picture type 2802, and a storage address 2803.

The display sequence 2801 is identification numbers for a target block to specify the reference pictures 2321. For example, for the reference picture 2321 of a macroblock included in B5 in FIG. 27B, "ref.idx0" is "1" and "ref.idx1" is "4" (see FIG. 23).

These reference numbers are assigned in ascending order of display with respect to the target picture, according to a predetermined rule such that each picture can be identified as being earlier than a target block or later than the target block. Note that the reference numbers are not limited to being assigned in the manner shown in FIG. 27B.

Each picture type 2802 expresses the encoding type of the respective picture, and stores the picture type of the picture data (see third level of FIG. 23).

Each address 2603 expresses an address in the frame memory 15 where the image data (see FIG. 24) of the respective picture is stored.

FIG. 28B shows an example of a macroblock address list 2820.

The macroblock address list 2820 is composed of macroblock locations 2821, and addresses 2822 in the frame memory 15 where the image data of the corresponding block is stored. Image data of a picture is ordinarily stored in contiguous areas, and therefore the address of each macroblock can be found based on the storage address 2803. However, the macroblock list 2820 is provided for convenience in the present embodiment.

The frame memory 27 of the encoding unit 20 is essentially the same as the frame memory 15, with the difference that it does not store the picture types 2802. This is because the picture types 2802 are not necessary for encoding.

Motion Vector Construction Unit 30

The motion vector construction unit 30 is composed of a determination unit 31, a program storage unit 32, and a prediction control unit 33.

The program storage unit 32 has a function of storing, in advance, a program for determining the processing method to be used by the motion compensation prediction unit 28.

The determination unit 31 has a function of executing the program stored in the program storage unit 32, in order to determine the processing method to be used by the motion compensation prediction unit 28, and causing the prediction control unit 33 to issue instructions in accordance with the determined processing method. The prediction control unit 33 has a function of issuing instructions to the motion compensation prediction unit 28 in accordance with the determined processing method.

More specifically speaking, the determination unit 31 receives the motion information 2320 from the variable length decoding unit 11, and creates new motion information based on the motion vector or vectors 2322 (see FIG. 23) included therein and the picture type 2802 of the reference picture 2321 (see FIG. 28). The encoder 10 performs encoding processing using this new motion information.

The picture types 2802 are sent from the variable length decoding unit 11 and temporarily stored in the memory 15, and the picture type 2802 of the reference picture 2321 is obtained from the stored picture types 2802.

The following describes the processing by the motion vector construction unit 30 in detail.

Figure 2:
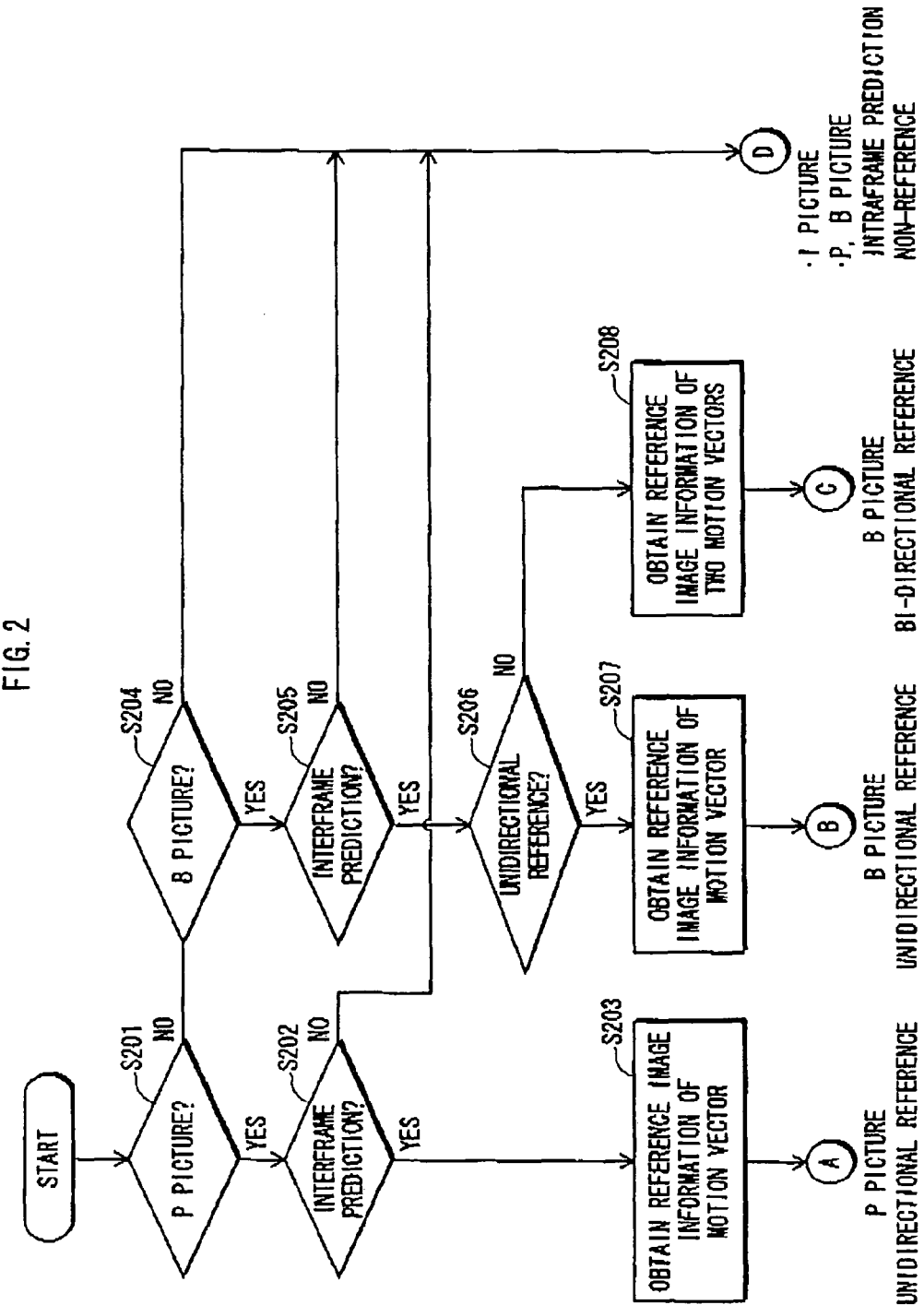
FIG. 2 is a flowchart (part 1) showing the procedure of a program stored in a program storage unit 32.

FIGS. 2 to 4 are flowcharts showing the procedure of the program stored in the program storage unit 32. The symbols A to E in these flowcharts are connectors. The flowcharts connect at points where the same symbols exist, to express one overall flowchart.

Put simply, the program is made up of: step (1) for specifying the relationship between the combination of a macroblock in an MPEG-4/AVC format moving picture and a reference image corresponding to the macroblock; step (2) for determining whether or not the relationship conforms with a condition about relationships stipulated in MPEG-2; and step (3) for determining, in accordance with the result of the determination, the processing method to be used by the motion compensation prediction unit 28. These steps correspond to the flowcharts in the following manner: step (1) corresponds to the whole of FIG. 2, step (2) corresponds to steps S301 to S304 of FIG. 3 and steps S401 to S404 of FIG. 4, and step (3) corresponds to steps S305 to S312 of FIG. 3 and steps 5405 to S410 of FIG. 4.

An Au delimiter (access unit delimiter) is provided at the head of each picture to indicate the head position. The AU delimiter includes a primary_pic_type that is information showing the slice types of the slices in the picture. This is utilized such that if an AU delimiter exists in variable length decoded data, the determination unit 31 obtains the primary_pic_type therefrom, and specifies the picture type based on the slice types shown by the primary_pic_type.

The slice types limit the encoding mode of the macroblocks in the slice. Specifically, a P slice is a slice that is interframe prediction encoded using intraframe encoding and one reference picture. A B slice is a slice that is interframe prediction encoded using intraframe encoding and either one or two reference pictures. An I slice is a slice that is only intraframe encoded. In MPEG-4/AVC, a slice type showing the type of the slice is given to each slice, and therefore one picture contains either one of a plurality of slice types. Therefore, if all the slices in a picture are the same slice type, the determination unit 31 determines the slice type to be the picture type. For example, if all the slices are P slices, the determination unit 31 specifies the picture as a P picture, and if all the slices are I slices, the determination unit 31 specifies the picture as an I picture.

When a plurality of slice types exist in the picture, the determination unit 31 specifies the picture as a B picture if a B slice exits, and specifies the picture as a P picture if a B slice does not exist. For example, if I, P and B slices are included in the picture, the determination unit 31 specifies the picture as a B picture. If I and P slices are included and no B slices are included, the determination unit 31 specifies the picture are a P picture.

Specification of picture types is not limited to being performed as described above. As one alternative example, the determination unit 31 may obtain the slice types from each slice in the picture from among the various data extracted by the variable length decoding unit 11, and specify the picture type from the obtained slice types. In this case, it is not necessary to obtain all slice types in the picture. The slice types may be obtained one at a time, and the picture specified as a B picture once one B slice is found to exist.

If this alternative method is used to specify the picture type, the determination unit 31 then, at steps S202, S205 and 5206, obtains the macroblock 2300 that is the target block (see FIG. 23) from the encoding information extracted by variable length decoding, obtains the macroblock type 2310 or the sub-macroblock type, and determines the prediction mode shown therein.

If the picture type is determined at the head of the picture, the determination unit 31 suspends picture type determination until the next AU delimiter appears.

First, the determination unit 31 determines whether or not the target block is a P picture (step S201) and whether or not the target block is a B picture (step S204), and assigns a picture type (I/P/B) to the picture that includes the target block.

In the case of an I picture (step S204. NO), since no motion vector to be reused exists, the determination unit 31 moves to processing that does not use a motion vector (D).

In the case of a P picture (step S201: YES), the determination unit 31 determines whether or not the prediction mode is interframe prediction (step S202), and if so (step S202: YES), obtains the reference image of the motion vector from the frame memory 15 (step S203).

Here, the reference image is obtained by obtaining image data from the storage address 2803 (see FIG. 28) of the display sequence 2801 corresponding to the reference picture 2321 of the macroblock 2300. The reference picture list 2800 is also obtained simultaneously.

In the case of intraframe prediction or non-reference (step S202: NO), since no motion vector to be reused exists, the determination unit 31 moves to the processing that does not use a motion vector (D).

In the case of a B picture (step S204: YES), the determination unit 31 determines whether or not the prediction mode is interframe prediction (step S205), and if so, further determines whether or not the unidirectional reference is used (bi-directional reference, step S206), and obtains the reference images of the motion vectors (step 8207, step S208).

The following describes processing of the case of each picture type,

P Pictures

The following describes the case of a P picture (A) (see FIG. A).

At step S301, the determination unit 31 determines whether or not the relationship between the target block of the P picture and the reference image conforms with a stipulation of the MPEG-2 format.

Here, the stipulation of the MPEG-2 format with respect to a block of a P picture and a reference image is that the reference image is the nearest past P picture or I picture to the picture of target block in the time order.

In other words, the determination unit 31 refers to the reference picture list 2800 obtained from the frame memory 15 at step S203, and if the picture type 2802 of the corresponding reference image is P or I, determines that the relationship conforms with the stipulation.

Furthermore, if all the picture types 2802 having lower numbers in the display sequence 2801 than the reference image are "B", the determination unit 31 determines that the reference image is the nearest in the time order. For example, in FIG. 27B, when the reference picture number of the reference image is "1", if the picture type of the reference picture number "0", in other words the picture type 2802, whose display sequence 2801 is "3", is "B", the determination unit 31 determines the reference image to be the nearest in the time order.

This method of referring to the picture type 2802 and determining whether the picture type conforms with the stipulation, and the method of determining the nearest in the time order based on the display sequence 2801 are the same in terms of the following determination of whether the relationship conforms with the stipulation is fulfilled.

If, as a result of the determination, the relationship conforms with the stipulation, the determination unit 31 determines that the reference image can be referenced (step S302: YES), and proceeds to step S305 in order to use the motion vector and so on in MPEG-2 encoding.

When the determination unit 31 determines that the stipulation is not fulfilled and that the reference image cannot be referenced (step S302: NO), the determination unit 31 proceeds to processing that does not use a motion vector (step S309).

B Picture: Unidirectional

The following describes the case of a B picture with unidirectional referencing (B, see FIG. 3).

At step S303, the determination unit 31 determines whether or not the relationship between a target block of the B picture and a reference image of unidirectional referencing conforms with a stipulation of MPEG-2. Here, the stipulation with respect to a target block of a B picture and one reference image of unidirectional referencing is that the reference image is the nearest past P picture or I picture to the picture of the target block in the time order.

If, as a result of the determination, the relationship conforms with a stipulation, the determination unit 31 determines that the reference image can be referenced (step S304: YES), and proceeds to step S307 in order to use the motion vector and so on in MPEG-2 encoding.

When the determination unit 31 determines that the relationship conforms with the stipulation and that the reference image cannot be referenced (step S304: NO), the determination unit 31 proceeds to processing that does not use a motion vector (step S309).

B Picture: Bi-Directional

The following describes the case of a B picture with bi-directional referencing (C, see FIG. 4).

At step S401, the determination unit 31 determines whether or not the relationship between a target block of the B picture and a reference image of bi-directional referencing conforms with a condition of MPEG-2. Here, the stipulation with respect to a target block of a B picture and two reference images of bi-directional referencing is that one of the two reference pictures is the nearest past P picture or I picture to the picture of the target block in the time order, and the other is the nearest future P picture or I picture to the picture of the target block in the time order.

In the determination by the determination unit 31, the determination result is divided into four types: step S402, step S403, step S404, and "other" (E).

The first type is that only one of the reference images is the nearest past or future I/P picture.

The second type is that both the reference images are both the nearest past or nearest future I/P picture.

The third is that one of the reference images is the nearest past I/P picture, and the other one is the nearest future I/P picture.

The fourth is other cases, in other words, when neither of the reference images conforms with the stipulation.

At step S402, when the one of the two reference images is determined to conform with the MPEG-2 stipulation, the determination unit 31 moves the processing to step S405.

At step S403, when both of the two reference images are determined to conform with the MPEG-2 stipulation, and both are forward references or both are backward references, the determination unit 31 moves the processing to step S407.

At step S404, when both of the two reference images are determined to conform with the MPEG-2 stipulation, and one reference image is a forward reference and one reference image is a backward reference, the determination unit 31 moves the processing to step S409.

In the case of "other" (step S404: NO), the determination unit 31 proceeds to (E).

Step (3)

Finally, in accordance with the determination result of step (2), the determination unit 31 determines which processing method is to be used by the motion compensation prediction unit 28, and the motion control unit 33 instructs the motion compensation prediction unit 28 of a processing method in accordance with the determination.

The following describes this for each picture type.

P Pictures

In the case of the reference image with respect to a target block of a P picture in MPEG-4/AVC being the nearest past P picture or I picture from the picture of the target block in the time order, the determination unit 31 determines that the motion compensation prediction unit 28 should reuse the motion vector (step S305). Reusing the motion vector means that instead of searching for a motion vector according to motion searching from the reference image, the motion compensation prediction unit 28 encodes using the MPEG-4/AVC motion vector as is as an MPEG-2 motion vector.

In this case, the determination unit 31 determines that the macroblock type (interframe reference) in MPEG-4/AVC is to be maintained in MPEG-2 (step S306, see FIG. 5).

B Picture: Unidirectional Reference

In the case of one reference image with respect to a target block of a B picture in MPEG-4/AVC being the nearest past or future P picture or I picture from the picture of the target block in the time order, the determination unit 31 determines that the motion compensation prediction unit 28 should reuse the motion vector (step S307).

In this case the determination unit 31 determines that the macroblock type in MPEG-4/AVC (unidirectional reference) should be maintained in MPEG-2 (step S308, FIG. 5).

B Picture: Bi-Directional Reference

In the case of only one of the two reference images with respect to a target block of a B picture in MPEG-4/AVC being the nearest past or future P picture or I picture from the picture of the target block in the time order, the determination unit 31 determines that the motion compensation prediction unit 28 should reuse the motion vector (step S405).

In this case, the determination unit 31 determines that the macroblock type in MPEG-2 is unidirectional reference (step S406, see FIG. 9).

When both reference images with respect to a block of a B picture in MPEG-4/AVC are the nearest past or future P picture or I picture from the picture of the target block in the time order, and the reference direction is forward reference for both or backward reference for both, the determination unit 31 selects one of the motion vectors, and determines that the selected motion vector should be reused (step S407).

Examples of the structure for selecting the motion vector include a structure that selects the corresponding block whose residual signal has the smaller value, and a structure that selects the smaller motion vector.

In this case, the determination unit 31 determine that the macroblock type in MPEG-2 is unidirectional (step S408, see FIG. 10).

Furthermore, when both reference images with respect to a block of a B picture in MPEG-4/AVC are the nearest past or future P picture or I picture from the picture of the target block in the time order, and one of the reference images is a forward reference and the other is a backward reference, the determination unit 31 determines that the two motion vectors should be reused (step S409).

In this case, the determination unit 31 determines that the macroblock type in MPEG-4/AVC (bi-directional reference) should be maintained in MPEG-2 (step S410, see FIG. 7).

Note that when the reference images with respect to the target block of a B picture do not conform with the MPEG-2 stipulation, the determination unit 31 determines that the motion vectors of the target block should not be used, and makes the macroblock type non-interframe referencing in MPEG-2 (steps S309 and S310, see FIG. 6 and FIG. 8).

I Pictures

In the case of a target block of an I picture, or a non-reference or intraframe prediction target block of a P/B picture, the determination unit 31 determines that a motion vector should not be used (step 6311), and determines that the macroblock type (non-interframe reference) should be maintained (step S312).

In accordance with the determination, the prediction control unit 33 sends information and the like that shows the motion vector, the macroblock type, and which image or images are the reference image or images to the motion compensation prediction unit 28, and instructs the motion compensation prediction unit 28 to encode using the information and the like.

Specifically, if a motion vector is to be reused, the prediction control unit 33 transmits the motion information 2320 to the motion compensation prediction unit 28, and if a motion vector is not to be reused, the prediction control unit 33 transmits notification to that effect.

Operation Example

The following describes operations with use of the drawings that show the relationship between macroblocks and reference images.

In each of FIGS. 5A and 5B to FIGS. 22A and 22D, "FIG. A" shows an image that is input when a moving picture is converted in the conversion apparatus of the present invention, and "FIG. B" shows the image that is output in this case.

In both "FIG. A" and "FIG. B", a same moving picture is shown laid out in display order from left to right. "FIG. A" shows the relationship between a target block and reference block(s) in MPEG-4/AVC format, and "FIG. B" shows the relationship between the same target block and reference block(s) after conversion to MPEG-2 format.

First, a typical pattern in described with use of FIGS. 5A and 5B to FIGS. 10A and 10B.

FIGS. 5A and 5B show the case of motion vector usage in unidirectional reference.

This applies in the case of a P picture, and a unidirectional reference B picture.

In FIG. 5A, the target block of the P picture on the right (step S201; YES), according to forward reference interframe prediction (step S202; YES), references a reference block in the reference image that is the I picture on the left. This reference relationship conforms with the MPEG-2 stipulation (step S362; YES). The motion vector here is MV1.

In this case, in accordance with the instruction from the prediction control unit 33, the motion compensation prediction unit 28 of the encoding unit 20 uses the motion vector MV1, which is the same as shown in FIG. 5A, as shown in FIG. 5B, to encode. The motion vector MV1 is used instead of using a motion vector obtained by motion searching. Here, the macroblock type is interframe reference.

FIGS. 6A and 6B are a case of the motion vector being unusable due to the macroblock type being changed.

This applies in the case of a P picture or a unidirectional reference B picture.

FIGS. 7A and 7B are a case of motion vector use in bi-directional referencing.

This applies to bi-directional reference of a B picture.

In FIG. 7A, the picture of the target block is a B picture (step S204; YES), the interframe prediction uses bi-directional reference (step S205; YES, step S206; NO), and both reference images are referencable under the stipulations of MPEG-2 (step S404; YES). Accordingly, as shown in FIG. 7B, two motion vectors MV1 and MV2 are used (step S409), and the macroblock type is bi-directional reference (step S410).

FIGS. 8A and 8B are a case of two vectors being unusable in a bi-directional reference.

This applies to bi-directional reference of a B-picture.

In FIG. 8A, the target block, which is in a B-picture, references two B pictures. However, MPEG-2 does not allow a B picture to be reference images (steps S204, S205, S206, S208, S401, S402, S403, S404; NO).

Accordingly, the motion compensation prediction unit 28, as shown in FIG. 8B, encodes without using the motion vectors of FIG. 8A, making the macroblock type non-interframe reference (steps S309, S310).

FIGS. 9A and 9B are a case of a motion vector being usable with the macroblock type being changed.

This applies to bi-directional reference of a B-picture.

In FIG. 9A, the target block, which is a B-picture, references an I picture and a B picture. MPEG-2 allows reference of an I picture, but does allow reference of a B picture (steps S204, S205, S206, 8208, S401, S402; YES).

Accordingly, the motion compensation prediction unit 28, as shown in FIG. 9B, encodes using the motion vector MV1 that references the I picture, changing the macroblock type to unidirectional reference (steps S305, S306).

FIGS. 10A and 10B are a case of one of the motion vectors being unusable due to the macroblock type being changed.

This applies to a bi-directional reference of a B-picture, In FIG. 10A, the target block, which is in a B picture, references two reference blocks 1 and 2 that are in a forward I picture. MPEG-2 allows neither referencing of two forward images nor referencing of two backward images (steps S204, S205, S206, S208, 54011, S402, S403; YES).

Accordingly, the motion compensation prediction unit 28, as shown in FIG. 10B, selects and reuses MV1, which is one of the two motion vectors MV1 and MV2, to encode the macroblock, changing the forward bi-directional reference to a forward reference (step 5407, S408).

Modification 1

Although reuse of motion vectors is described in terms of typical patterns in the first embodiment, there are cases in which, a motion vector, although reused, cannot be used exactly as is, or is preferably not used exactly as is.

The case of a motion vector not being able to be used as is described with use of FIGS. 11A and 11B, and the case of a motion vector preferably not being used exactly as is described with use of FIGS. 12A and 12B.

A problem of pixel accuracy is one example of a reason that a motion vector may not be able to be used as is.

Specifically, in MPEG-4/AVC uses quarter-pixel accuracy, while MPEG-2 uses half-pixel accuracy.

FIG. 11A shows a case in which only one of the two motion vectors of a B picture are reused, which is the same state as FIG. 9A, but the case shown in FIG. 11A is not the only possible case.

Here, the pixel accuracy of the motion vector is ¼ in MPEG-4/AVC, and the pixel accuracy of the motion vector is ½ in MPEG-2. Consequently, if the motion compensation prediction unit 28 designates the motion vector MV1 of FIG. 11A at quarter-pixel accuracy, correction is performed to round the motion vector MV1 to half-pixel accuracy as shown in FIG. 11B, and a motion vector MV3 obtained as a result is used to encode. This processing is performed in the motion vector construction unit 30, which transmits the new motion vector to the motion compensation prediction unit 28. Alternatively, this processing may be performed in the motion compensation prediction unit 28.

The following describes changing the macroblock type in a case in which it is preferable not to use a motion vector exactly as is.

FIG. 12A shows a case in which only one of the two motion vectors of a B picture are reused, which is the same state as FIG. 9A, and the macroblock type is changed.

In the case of bi-directional reference, an optimum prediction image is obtained by taking the average of the two reference blocks (reference block 1 and reference block 2). Specifically, an interframe prediction error 2330 (see FIG. 23) that is a relatively small amount of data.

However, there is a possibility that changing the two reference blocks to one reference block, the prediction image will change, and the error from the prediction image will be greater than expected.

When there is a possibility that the error will be relatively large, it would suffice to re-search for a motion vector to obtain an optimum motion vector, but the relative large processing amount for motion vector searching is a drawback.

In view of this, only the vicinity of the reference block of the motion vector (MV1) that is to be reused is used as the range of re-searching. This obtains an optimum new motion vector while also significantly reducing the processing time.

As shown in FIG. 12B, by re-searching in a predetermined range with respect the location of reference block 1 indicated by MV1 in the reference image, another motion vector MV3 is found, and encoding is performed using the motion vector MV3.

More specifically, the motion compensation prediction unit 28 widens the search range to, for example, ±30 pixels in each of the x direction and the y direction with respect to the coordinate location of the reference block 1, and performs a motion search to find a block in the search range that has the smallest prediction error. The motion vector that indicates the found block is MV3.

The motion vector construction unit 30 designates a reference image and a reference block, and issues an instruction to re-search in the vicinity of the reference block, to the motion compensation prediction unit 28.

Alternatively, the data of the reference block included in the motion vector search range may be found, for example, in the following way by the motion vector construction unit 30.

Figure 29:
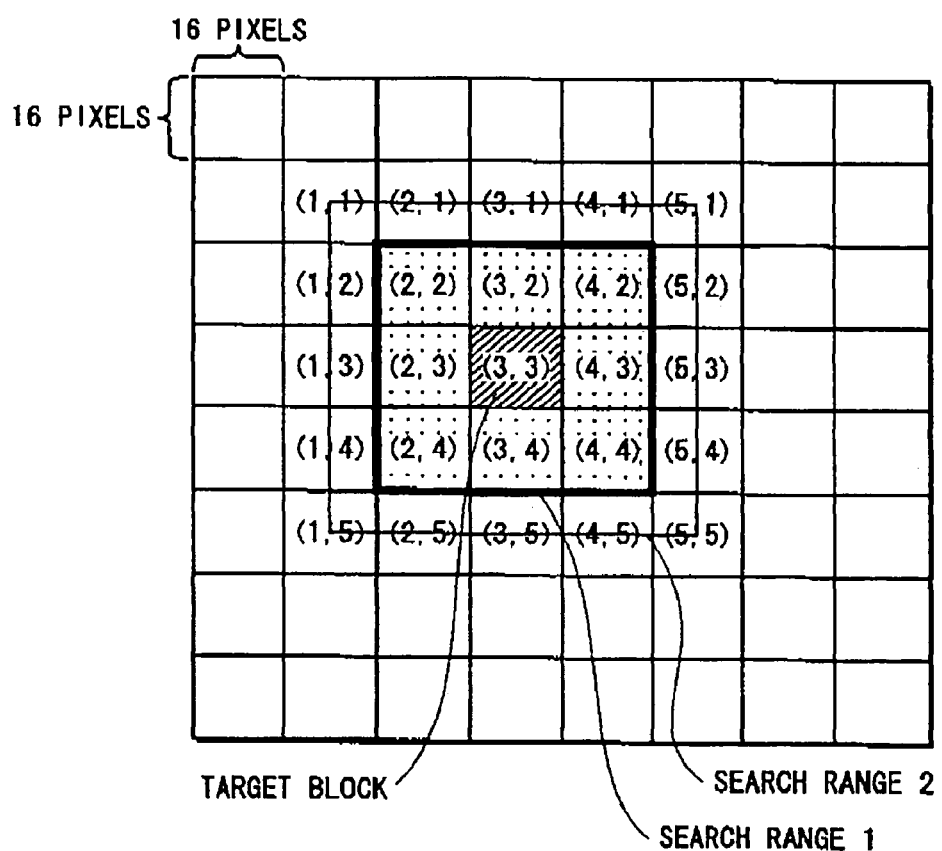
FIG. 29 shows an example of a macroblock selection method in re-searching.

FIG. 29 expresses a target block and macroblocks in the vicinity thereof. Here, the data of the macroblock included in a search range 1 is, for example, eight macroblocks having respective data (2,2), (2,3) and so on, and the target block (3,3).

The macroblock data can be easily obtained by referring to the macroblock address list 2820 in the frame memory 27. For example, if the macroblock location 2821 is "(0,2)", data of one block can be read from the address 2822 "addr02".

Similarly, in the case of the search area 2, macroblocks (1,1) and so on included in the range are read.

Modification Example 2

The following describes a case in which, even if a motion vector is judged not to be reusable in the first embodiment, the motion vector is able to be reused by changing the reference block of the motion vector.

While it is possible that the prediction error will increase as a result of changing the reference block, this structure is advantageous because it eliminates the need to perform motion vector re-search processing.

FIG. 13A shows the same state as FIG. 9A.

In FIG. 9B, the motion vector MV2 is discarded, and encoding is performed using only the motion vector MV1.

In contrast, as shown in FIG. 13B, encoding is performed using the motion vector MV3 instead of the motion vector MV2.

The motion vector MV3 has the same value that indicates the same spatial coordinates as the motion vector MV2. However, the motion vector MV3 differs in that the reference image that it indicates is an I picture or a P picture that is near to the original reference image in the time order.

The reason for this is that there is a high possibility that the pixel value of an image that is neat in the time order will be similar.

The motion compensation prediction unit 28 selects the reference image 3 from among the images whose relationship with the target block conform with the stipulations of MPEG-2. This processing may be performed in the motion vector construction unit 30.

Since there is a possibility that the error between the reference block 3 and the target block will be large, a possible structure is one in which a predetermined range in the vicinity of the reference block 3 is searched in order to find a reference block with a small error (see FIG. 21 described later).

Second Embodiment

While the first embodiment uses examples of images, the present invention may be applied to a field structure as shown in FIGS. 14A and 14B to FIGS. 16A and 16B.

A field is one of the halves of an image that has been divided into two; with the group of odd-numbered scanning lines being a top field, and the group of even-numbered scanning lines being the bottom field.

For example, ordinary television employs a so-called interlace method by which the top field and the bottom field are displayed alternately.

With this kind of image structure, it is possible to perform encoding by treating one field as one image.

In other words, data format conversion such as described in the first embodiment, in other words, conversion of moving picture data created with a high-compression encoding method to MPEG-2 data, can be performed by substituting images for fields.

Looking at the specification of the MPEG-2 standard, P pictures and I pictures can reference both fields of a reference images in either direction from the field itself. In addition, in the case of an I picture, a macroblock of the bottom field can reference the top field.

In detail, in the MPEG-2 field structure, the following are allowed as reference images: in the case of an I picture, a top field may not reference, while a bottom field may reference the top field; in the case of a P picture, both the top field and the bottom field may reference either of the fields of the nearest past P picture or I picture in the time order; and in the case of a B picture, one of the top field and the bottom field may reference either of the fields of the nearest past P picture or I picture in the time order, and the other one may reference both fields in the nearest P picture or I picture in the nearest future P picture or I picture in the time order. These restrictions are the same in MPEG-4.

Consequently, the conversion such as that of the first embodiment can be performed in a standard that allows referencing of reference images with the same restrictions as current MPEG-4/AVC.

For instance, taking the example in FIG. 14, the reference images are the bottom field of an I picture and the top field of a B picture. Only the former is able to be referenced as a reference image in MPEG-2. Accordingly, the motion vector can be reused with the former as a reference image by changing the macroblock type to unidirectional reference.

Although the MPEG-2 standard does not currently support freedom of interframe referencing to the same extent as the MPEG-4/AVC standard, it is possible that such referencing will be supported in the future.

That is to say that it is anticipated that moving picture encoding methods that appear subsequent to MPEG-2 and MPEG-4 will exhibit freer image referencing in order to increase the compression rate, such as MPEG-4/AVC.

One anticipated encoding method is a method that, in addition to the current MPEG-2 standard, allows the bottom field of a B picture to reference the top field of the same image, but, as with MPEG-2, does not enable referencing of other B pictures.

In other words, such a standard could be said to be a moving picture encoding method that has a degree of freedom of reference images that is higher than with the restrictions of MPEG-2 and lower than with the restrictions of MPEG-4/AVC.

This is because, if the maximum number of images that can be made reference images is 16 (32 pictures) as in MPEG-4/AVC, since it is necessary to leave the reference images in the memory during decoding, the load will be greater for reasons including a greater amount of memory being required by the decoder.

FIGS. 15A and 15B show a method for converting from MPEG-4/AVC to a moving picture encoding method that has this kind of reference image restriction.

In the example in FIGS. 15A and 15B, since the reference image is a B picture, only field reference in the same image is reused, and the motion vector is not reused.

In an encoding method A having restrictions such as MPEG-2, since the target image is a B picture, neither of the motion vectors can be reused. However, in an encoding method B having a restriction that the bottom field of a B picture can reference the top field of the same image, the motion vector of the field reference in the same image can be reused.

With FIGS. 15A and 15B, a description has been given of one anticipated encoding format in which referencing within the same image is possible in addition to the reference image restrictions of MPEG-2. However, this description is also true for other encoding methods that use other reference images.

This may be possible when converting a moving picture encoded with one such encoding format (encoding method D) to MPEG-2 for instance. As one example of this case, only one of the two motion vectors is reusable as shown in FIGS. 16A and 16B. This is because a reference cannot be made with the same image of a B picture in MPEG-2. FIG. 16A expresses a motion vector in the encoding method B, and FIG. 16B expresses the motion vector in MPEG-2.

Third Embodiment

While the first embodiment gives an example of reusing motion vectors that exist in data of the MPEG-4/AVC format, the present embodiment gives an example of a case in which motion vectors that do not exist in the data but are found dynamically during decoding of macroblocks are reused.

In MPEG-4/AVC, a direct mode is defined in which a reference image can be referenced even if a motion vector does not exist.

Direct mode is an encoding mode that is provided to increase the compression rate, and that generates motion vectors by predicting them from motion information of other blocks. In other words, the amount of data relating to motion information is reduced.

Since MPEG-2 does not support direct mode, none of the motion vectors than can be reused in conversion from MPEG-4/AVC, and therefore reference images cannot be referenced.

In the present embodiment, virtual motion vectors calculated during MPEG-4/AVC decoding are reused as MPEG-2 motion vectors. In other words, motion vectors that did not exist in MPEG-4/AVC are calculated and attached in MPEG-2.

There are two types of direct mode, which are described with use of FIGS. 17A and 17B, and FIGS. 18A and 19B, respectively.

The following describes motion information generation in the first direct mode.

The first direct mode is a spatial direct mode for virtually finding the motion vector(s) of a macroblock that is to be a target block, using motion vector information of macroblocks of surrounding locations.

In spatial direct mode, prediction is essentially performed using three macroblocks: a macroblock 1701 on the right of the target block, a macroblock 1702 above the target block, and a macroblock 1703 at the top right of the target block.

The prediction method involves selecting, from among the motion vectors of these three macroblocks (1701, 1702, 1703), a motion vector indicating the nearest pant reference image in the time order, and a motion vector indicating the nearest future motion vector in the time order, and predicting using these as virtual motion vectors of the target block. The target block uses bi-directional reference.

In FIG. 17A, the macroblock 1701 has the motion vector MV5, the macroblock 1702 has the motion vector MV1, and the macroblock 1703 has the motion vector MV2.

Among these three motion vectors, the motion vector MV1 that indicates the nearest past reference image in the time order and the motion vector MV2 that indicates the nearest future reference image in the time order are selected, and used as is as the motion vectors of the target block.

As one example, the target block motion vectors are MV3 and MV4 (see FIG. 17B).

The value of MV3 as a vector is the same as MV1, and the value of MV4 as a vector is the same as MV2. Furthermore, the reference images are reference image 1 and reference image 2 which are the same as for MV1 and MV2. The reference block 1 and reference block 2 are determined from the reference images and the motion vectors.

The following describes motion information generation in the second direct mode, with use of FIGS. 18A and 18B.

The second direct mode is a temporal direct mode for virtually finding the notion vector(s) of a target block, using motion information of temporally surrounding macroblocks.

Temporal direct mode basically estimates the motion vector(s) of the target block from the motion vector that indicates the macroblock 1801 of the same location as the target macroblock in the nearest future reference image in the time order (reference image 2). The target block uses bi-directional reference.

The virtual motion vectors MV2 and MV3 are found from the motion vector MV1 of the macroblock 1801, and the ratio of the time interval between reference image 1 and reference image 2 and the time interval between reference image 1 and the target image.

The found MV2 and MV3 are the motion vectors of the target block.

Here, the reference block of MV2 is a reference block 1 that is in the reference image 1 which is the same image that the macroblock 1082 is in, and the reference block of MV3 is a reference block 2 that is in the reference image 2 which is the same image that the macroblock 1801 is in.

Fourth Embodiment

In the present embodiment a case is described in which, when motion vectors are reused, the type (I/P) of the reference image of a motion vector and the time direction requirements are fulfilled, but the location of the image of the reference block does not fulfill requirements. The description is given with use of FIGS. 19A and 19B and FIGS. 20A and 20B.

In MPEG-4/AVC, the concept of reference images is extended to outside of the image, and therefore a macroblock whose motion vector extends out of the image may be referenced. An example of this is the macroblock 1901 of the reference image 1 in FIG. 19A.

Referencing the area outside the image is performed based on the assumption that the area outside of the image contains the pixels at the edge of the image.

On the other hand, in MPEG-2 it is necessary that motion vectors always reference within the image.

For instance, in the case of a target block having a bi-directional reference and, as shown in FIG. 19A, only the motion vector MV1 referencing outside the image, only the motion vector MV2 of the reference block 2 that is within the image can be reused. However, since this is an example of backward reference, the motion vector MV2 cannot be reused.

Furthermore, the motion vectors cannot be reused if they are both out-of-image references.

Hence, the motion vector is corrected such that the out-of-image reference becomes an in image reference, as shown in FIG. 20B, and therefore motion vector can be referenced in MPEG-2.

In this case, in MPEG-2, a reference block (reference block 2) that is not the reference block that was initially assumed (reference block 1) is used, and therefore then is a chance that an error will be generated from the prediction image.

In view of the possibility of such a case occurring, processing may be performed to reduce the generation of errors from the prediction image as much as possible by performing re-searching of the area as described in the first embodiment (see FIG. 12).

Supplementary Remarks

Although preferred embodiments of the present invention have been described, the present invention is not limited to these preferred embodiments, and cases such as the following are included in the present invention.

(1) In the embodiments, for a reference image that includes a reference block, the motion vector is basically reused without changing the reference image. However, the motion vector may be reused by changing the reference image. Note that the case described here is an extension of the case described with FIG. 13.

An example of this is shown in FIGS. 21A and 21B.

In FIG. 21A, the reference image (reference image 1) is a B picture, and therefore the motion vector cannot be reused. However, by making the reference image a P picture (reference image 2), the motion vector MV1 can be reused.

However, since there is a possibility of a greater error with the prediction image in this case, re-searching may be performed with the vicinity of the reference block of the picture as the search range, and a new reference block (reference block 2) and a new motion vector MV2 found (see FIG. 21B).

Furthermore, although only the reference image is changed in the example in FIGS. 21A and 21B, the location of the reference block may be changed together with the reference image, without re-searching.

Figure 22A:
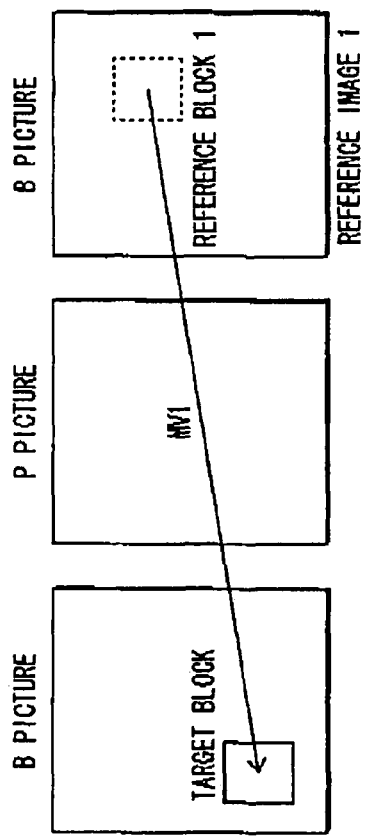
FIGS. 22A and 22B show an example of operations when a reference block is shifted to another image.
Figure 22B:
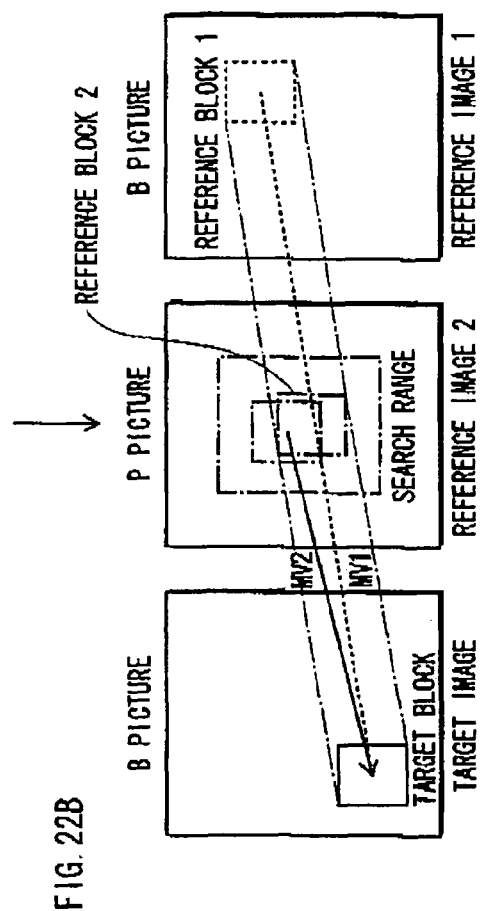

An example of this is shown in FIGS. 22A and 22B.

In FIG. 22B, the reference image is changed to a P picture (reference image 2), and, from the motion vector MV1, and the ratio of the time interval between the reference image 1 and the reference image 2 and the time interval between reference image 1and the target image, the location to which the reference block is shifted is determined, and a new reference block (reference block 2) is found.

Since there is also a possibility in this case of a greater error with the prediction image, re-searching may be performed with the vicinity of the reference block of the P picture as the search range, and a new motion vector MV2 found.

(2) In the embodiments, the descriptions of the present invention were given based on the assumption of conversion from MPEG-4/AVC to MPEG-2. However, the present invention is not limited to these encoding methods, and may be applied to conversion between any encoding methods if restrictions regarding motion vectors differ between the encoding methods.

For instance, the present invention may be applied to conversion between encoding methods including conversion from MPEG-4/AVC to MPEG-4, conversion from MPEG/4-AVC to VC1, conversion from MPEG-4/AVC to AVS (Audio Video Coding Standard of China), and conversion between MPEG-4/AVC main profile to MPEG-4/AVC baseline profile.

Furthermore, although the descriptions are given for picture-to-picture conversion in the embodiments, the present invention may be applied to slice-to-slice conversion or picture-to-slice conversion.

(3) Although the descriptions are given for conversion from MPEG-4/AVC to MPEG-2 in the embodiments, cases of conversion from MPEG-2 to MPEG-4/AVC are possible.

One difference between MPEG-2 and MPEG-4/AVC is the motion vector search range. The maximum motion vector search range stipulated in MPEG-4/AVC is smaller than the maximum motion vector search range in MPEG-2.

The moving picture conversion apparatus may have a structure whereby, in conversion from MPEG-2 to MPEG-4/AVC, the image conversion apparatus determines whether or not to use a motion vector for an MPEG-2 block according to whether the motion vector falls within the maximum search range stipulated in MPEG-4/AVC.

If the motion vector does not fall within the maximum search range-stipulated in MPEG-4/AVC, the motion vector may be shifted so as to fall into the maximum search range in order to be reused.

(4) Part or all of compositional elements of the moving picture conversion apparatus 100 shown in FIG. 1 may me realized by one or a plurality of integrated circuits, or by a computer program, or by other means.

Although the determination unit 31 is structured so as to execute a program stored in the program storage unit 32 in order to determine the processing method that the motion compensation prediction unit 28 is to perform, the determination unit 31 may instead be structured using a logical circuit. The input signals of this logical circuit are information necessary for determination, such as the slice type or the block type and information relating to the reference image, which is obtained from the data extracted by the variable length decoding unit 11. In accordance with the input signals, the logical circuit outputs an output signal showing the processing method to be performed by the motion compensation prediction unit 28.

(5) In the case of the computer program, the computer program may be executed by a computer that reads the computer program from a recording medium such as a CD-ROM on which the computer program is written, or the computer program may be downloaded via a network by a computer and executed by the computer.

(6) Although in the embodiments examples are described of converting moving image data in units of slices into moving image data in units of pictures, the concept of the present invention is applicable to conversion from units of slices to units of slices and conversion from units of pictures to units of pictures.

(7) Part or all of the compositional elements of the moving picture conversion apparatus 100 shown in FIG. 1 may be composed of an LSI.

INDUSTRIAL APPLICABILITY

The present can be applied to an AV device that performs conversion processing of moving pictures.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A moving picture conversion apparatus comprising:
a conversion unit that converts first moving picture data encoded with a first motion compensated prediction method into second moving picture data encoded with a second motion compensated prediction method, wherein
the conversion unit includes:
a selection unit operable to select, from among one or more motion vectors of a block in the first moving picture data, a first motion vector on condition that the first motion vector fulfills a condition as a second motion vector according to the second motion compensated prediction method; and
an encoding unit operable to perform encoding that complies with the second motion compensated prediction method, wherein
the encoding unit encodes the block with use of the selected motion vector.

2. The moving picture conversion apparatus of claim 1, wherein in the encoding of the block, the encoding unit uses the selected motion vector without modification.

3. The moving picture conversion apparatus of claim 1, wherein in the encoding of the block, the encoding unit performs motion searching in a predetermined search range that includes a reference block shown by the selected motion vector and that is based on a location, in a reference image, indicated by the selected motion vector, and encodes the block with use of the motion vector obtained as a result of the searching instead of with use of the selected motion vector.

4. The moving picture conversion apparatus of claim 1, wherein the condition that the selected motion vector is to fulfill is a restriction of an encoding type of a reference image of the block, and the selection unit selects the motion vector that fulfills the condition.

5. The moving picture conversion apparatus of claim 1, wherein
the condition that the selected motion vector is to fulfill is a restriction of an encoding type of a reference image of the block, and
the selection unit, when a motion vector among the one or more motion vectors of the block included in the first moving picture data indicates a reference image that does not fulfill the condition, substitutes the reference image with another reference image that fulfills the condition, and then will select the motion vector for subsequent encoding.

6. The moving picture conversion apparatus of claim 5, wherein
in the encoding of the block, the encoding unit performs motion searching in a predetermined search range that includes a reference block shown by the selected motion vector and that is based on a location, in a reference image, indicated by the selected motion vector, and encodes the block with use of the motion vector obtained as a result of the searching instead of with use of the selected motion vector.

7. The moving picture conversion apparatus of claim 1, wherein
the condition that the selected motion vector is to fulfill is that, if a total number of motion vectors of the block is one, a reference image of the one motion vector is an image displayed before an image in which the block is included, and when one of the one or more motion vectors of the block in the first moving picture data fulfill the condition, the selection unit selects the one of the one or more motion vectors.

8. The moving picture conversion apparatus of claim 1, wherein
the condition that the selected motion vector is to fulfill is that, if a total number of motion vectors of the block is two, a reference image of one of the two motion vectors is an image displayed before the image in which the block is included and a reference image of the other of the two motion vectors is an image displayed after the image in which the block is included, and
when two of the one or more motion vectors of the block in the first moving picture data fulfill the condition, the selection unit selects the two of the one or more motion vectors.

9. The moving picture conversion apparatus of claim 8 wherein
when a total number of motion vectors of the block in the first moving picture data is two and the selection unit selects only one of the two motion vectors, the encoding unit performs encoding with use of the one motion vector, and modifies information that shows a motion prediction type of the block from showing a motion prediction type that uses two motion vectors to showing a motion prediction type that uses one motion vector.

10. The moving picture conversion apparatus of claim 1, wherein
the condition that the selected motion vector is to fulfill is that, in a display sequence of imager, an image whose encoding type is a predetermined type exists between the image that includes the block and
a reference image of the block, and when a motion vector among the one or more motion vectors of the block in the first moving picture data indicates a reference image that fulfills the condition, the selection unit selects the motion vector.

11. The moving picture conversion apparatus of claim 1, wherein
the condition that the selected motion vector is to fulfill is that each of one or more reference images of the block is one of (i) an image that, in a display time order, is a nearest past P picture or I picture with respect to the image in which the block is included, (ii) an image that, in the display time order, is a nearest future P picture or I picture with respect to the image in which the block is included, and (iii) the image in which the block is included, and
when a motion vector among the one or more motion vectors of the block in the first moving picture data indicates a reference image that fulfills the condition, the selection unit selects the motion vector.

12. The moving picture conversion apparatus of claim 1, wherein
the condition is that any given reference block of the block exists entirely within a reference image in which the reference block is included, and
when a motion vector among the one or more motion vectors of the block in the first moving picture data indicates a reference image that fulfills the condition, the selection unit selects the motion vector.

13. The moving picture conversion apparatus of claim 12, wherein
when a motion vector exists that has not been selected by the selection unit among the one or more motion vectors of the block, if, by correcting the motion vector that has not been selected, the reference block of a resultant corrected motion vector exists entirely within the reference image, the selection unit selects the resultant corrected motion vector.

14. The moving picture conversion apparatus of claim 1, wherein
the first motion compensated prediction method complies with an MPEG-4/AVC standard.

15. The moving picture conversion apparatus of claim 1, wherein
the second motion compensated prediction method complies with one of an MPEG-2 standard and an MPEG-4 standard.

16. A moving picture conversion method comprising:
a conversion step that converts first moving picture data encoded with a first motion compensated prediction method into second moving picture data encoded with a second motion compensated prediction method, wherein the conversion step includes:
  a selection step of selecting, from among one or more motion vectors of a block in the first moving picture data, a first motion vector on condition that the first motion vector fulfills a condition as a second motion vector according to the second motion compensated prediction method; and
  an encoding step of performing encoding that complies with the second motion compensated prediction method, wherein
  the encoding step encodes the block with use of the selected motion vector.

17. A non-transitory computer-readable medium on which is recorded a computer program, the computer program causing an apparatus capable of executing the computer program to perform moving picture conversion processing, the computer program comprising:
a conversion step that converts first moving picture data encoded with a first motion compensated prediction method into second moving picture data encoded with a second motion compensated prediction method, wherein the conversion step includes:
  a selection step of selecting, from among one or more motion vectors of a block in the first moving picture data, a first motion vector on condition that the first motion vector fulfills a condition as a second motion vector according to the second motion compensated prediction method; and
  an encoding step of performing encoding that complies with the second motion compensated prediction method, wherein the encoding step encodes the block with use of the selected motion vector.

18. An integrated circuit in a moving picture conversion comprising:
a conversion unit that converts first moving picture data encoded with a first motion compensated prediction method into second moving picture data encoded with a second motion compensated prediction method, wherein the conversion unit includes:
  a selection unit operable to select, from among one or more motion vectors of a block in the first moving picture data, a first motion vector on condition that the first motion vector fulfills a condition as a second motion vector according to the second motion compensated prediction method; and
  an encoding unit operable to perform encoding that complies with the second motion compensated prediction method, wherein
  the encoding unit encodes the block with use of the selected motion vector.

* * * * *